（12）United States Patent
Kohen

(10) Patent No.: US 10,989,400 B2
(45) Date of Patent: Apr. 27, 2021

(54) MODULAR SMART QUICK CONNECT DEVICE FOR ELECTRICAL FIXTURES

(71) Applicant: Ran Roland Kohen, Aventura, FL (US)

(72) Inventor: Ran Roland Kohen, Aventura, FL (US)

( * ) Notice: Subject to any disclaimer, the term of this patent is extended or adjusted under 35 U.S.C. 154(b) by 0 days.

(21) Appl. No.: 16/491,321

(22) PCT Filed: Mar. 5, 2018

(86) PCT No.: PCT/US2018/020987
§ 371 (c)(1),
(2) Date: Sep. 5, 2019

(87) PCT Pub. No.: WO2018/165058
PCT Pub. Date: Sep. 13, 2018

(65) Prior Publication Data
US 2020/0018469 A1 Jan. 16, 2020

Related U.S. Application Data

(60) Provisional application No. 62/467,176, filed on Mar. 5, 2017, provisional application No. 62/515,464, filed (Continued)

(51) Int. Cl.
*F21V 23/06* (2006.01)
*H05B 47/19* (2020.01)
(Continued)

(52) U.S. Cl.
CPC .............. *F21V 23/06* (2013.01); *F21S 8/061* (2013.01); *F21V 21/02* (2013.01);
(Continued)

(58) Field of Classification Search
CPC .. F21S 8/061; F21S 8/03; F21V 23/06; F21V 21/002; F21V 21/02; F21V 21/03;
(Continued)

(56) References Cited

U.S. PATENT DOCUMENTS 484,911 A   10/1892 Green
1,595,972 A   8/1926 DeReamer
(Continued)

FOREIGN PATENT DOCUMENTS

CN            1728475 A    2/2006
CN   ZL 01 8 23877.7       11/2007
(Continued)

OTHER PUBLICATIONS

Office Action for U.S. Appl. No. 15/515,664, dated Sep. 10, 2019.
(Continued)

*Primary Examiner* — Peggy A Neils
(74) *Attorney, Agent, or Firm* — Paul D. Bianco; Gary S. Winer; Fleit Intellectual Property Law

(57) ABSTRACT

A socket and plug are used to connect an electrical fixture with electrical power supply wiring, and for mounting the fixture on a support. The socket has internal cavities with electrically conductive contact terminals which establish an electrical connection between the electrical power supply wiring and the socket. A plug is rigidly fixed to a fixture, and is inserted into the socket. The plug has male connectors electrically connected to the fixture and engageable with the conductive terminals within the socket. A releasable latch is carried on the combination of the plug and the socket for releasably mounting the fixture on the support. A hub surrounds the plug and socket, and houses a plurality of sensor modules releasably connectable to a periphery of the hub. The sensor modules each include an electronic device operative to generate or transmit electronic data.

11 Claims, 13 Drawing Sheets

Related U.S. Application Data on Jun. 5, 2017, provisional application No. 62/543,912, filed on Aug. 10, 2017.

(51) Int. Cl.
*F21S 8/06* (2006.01)
*F21V 21/02* (2006.01)
*F21V 23/04* (2006.01)
*H01R 24/38* (2011.01)

(52) U.S. Cl.
CPC ......... *F21V 23/0442* (2013.01); *H01R 24/38* (2013.01); *H05B 47/19* (2020.01)

(58) Field of Classification Search
CPC . F21V 23/0442; F21Y 2115/10; G08B 25/10; H02G 3/20; H05B 47/19
See application file for complete search history.

(56) References Cited

U.S. PATENT DOCUMENTS

| | | | |
|---|---|---|---|
| 1,897,954 | A | 2/1933 | D'Olier |
| 2,077,587 | A | 4/1937 | Rowe |
| 2,308,016 | A | 1/1943 | Mihalyi |
| 2,313,481 | A | 3/1943 | Rendano |
| 2,494,428 | A | 1/1950 | Buck |
| 2,673,966 | A | 3/1954 | Larkin |
| 2,726,372 | A | 12/1955 | Appleton |
| 2,728,895 | A | 12/1955 | Quackenbush |
| 2,863,037 | A | 12/1958 | Johnstone |
| 3,118,713 | A | 1/1964 | Ellis |
| 3,159,444 | A | 12/1964 | Stine |
| 3,193,636 | A | 7/1965 | Daniels |
| 3,386,071 | A | 5/1968 | Allen |
| 3,398,260 | A | 8/1968 | Martens |
| 3,521,216 | A | 7/1970 | Tolegian |
| 3,585,564 | A | 6/1971 | Skjervoll |
| 3,648,002 | A | 3/1972 | Du Rocher |
| 3,651,443 | A | 3/1972 | Quilez |
| 3,668,603 | A | 6/1972 | Burgess et al. |
| 3,798,584 | A | 3/1974 | Person |
| 3,808,577 | A | 4/1974 | Mathauser |
| 3,813,478 | A | 5/1974 | Ervin |
| 3,855,564 | A | 12/1974 | Dumas |
| 3,871,732 | A | 3/1975 | Appleton |
| 4,059,327 | A | 11/1977 | Vann |
| 4,079,244 | A | 3/1978 | Bortoluzzi |
| 4,083,619 | A | 4/1978 | McCormick et al. |
| 4,107,770 | A | 8/1978 | Weber |
| 4,133,594 | A | 1/1979 | Laverick et al. |
| 4,335,927 | A | 6/1982 | Allen et al. |
| 4,448,388 | A | 5/1984 | Dennis |
| 4,462,653 | A | 7/1984 | Flederbach |
| 4,473,869 | A | 9/1984 | De Widt |
| 4,588,248 | A | 5/1986 | Moore |
| 4,631,648 | A | 12/1986 | Nilssen |
| 4,681,385 | A | 7/1987 | Kruger et al. |
| 4,753,600 | A | 6/1988 | Williams |
| 5,003,128 | A | 3/1991 | Grondin |
| 5,034,869 | A | 7/1991 | Choi |
| 5,173,053 | A | 12/1992 | Swanson et al. |
| 5,250,874 | A | 10/1993 | Hall et al. |
| 5,352,122 | A | 10/1994 | Speyer |
| 5,362,122 | A | 11/1994 | Reihl et al. |
| 5,438,216 | A | 8/1995 | Juskey et al. |
| 5,442,532 | A | 8/1995 | Boulos et al. |
| 5,494,325 | A | 2/1996 | Liu et al. |
| 5,494,326 | A | 2/1996 | Hinds |
| 5,536,685 | A | 7/1996 | Burward-Hoy |
| 5,551,882 | A | 9/1996 | Whiteman |
| 5,562,458 | A | 10/1996 | Stora et al. |
| 5,584,726 | A | 12/1996 | Le Gallic et al. |
| 5,600,537 | A | 2/1997 | Gordin |
| 5,622,873 | A | 4/1997 | Kim et al. |
| 5,668,920 | A | 9/1997 | Pelonis |
| 5,710,541 | A | 1/1998 | Stanley |
| 5,754,408 | A | 5/1998 | Derouiche |
| 5,777,391 | A | 7/1998 | Nakamura et al. |
| 5,790,381 | A | 8/1998 | Derouiche et al. |
| 5,808,556 | A | 9/1998 | Nelson |
| 5,836,781 | A | 11/1998 | Klyzin |
| 5,952,714 | A | 9/1999 | Sano et al. |
| 5,962,810 | A | 10/1999 | Glenn |
| 6,068,490 | A | 5/2000 | Salzberg |
| 6,093,029 | A | 7/2000 | Kwon et al. |
| 6,129,598 | A | 10/2000 | Yu et al. |
| 6,135,800 | A | 10/2000 | Majors |
| 6,170,967 | B1 | 1/2001 | Usher et al. |
| 6,175,159 | B1 | 1/2001 | Sasaki |
| 6,240,247 | B1 | 5/2001 | Reiker |
| 6,241,559 | B1 | 6/2001 | Taylor |
| 6,332,794 | B1 | 12/2001 | Tzeng Jeng |
| 6,340,790 | B1 | 1/2002 | Gordin et al. |
| 6,364,716 | B1 | 4/2002 | Seo |
| 6,366,733 | B1 | 4/2002 | Reiker |
| 6,398,392 | B2 | 6/2002 | Gordin et al. |
| 6,422,722 | B1 | 7/2002 | Voltolina |
| 6,517,223 | B2 | 2/2003 | Hsu |
| 6,595,782 | B1 | 7/2003 | Hsiao |
| 6,598,990 | B2 | 7/2003 | Li |
| 6,631,243 | B2 | 10/2003 | Reiker |
| 6,648,488 | B1 | 11/2003 | Pearce |
| 6,751,406 | B2 | 6/2004 | Reiker |
| 6,793,383 | B2 | 9/2004 | Wu |
| 6,821,089 | B2 | 11/2004 | Bilskie |
| 6,837,754 | B1 | 1/2005 | Walton |
| 6,962,498 | B2 | 11/2005 | Kohen |
| 7,001,199 | B1 | 2/2006 | Badalpour |
| 7,052,301 | B2 | 5/2006 | Garcia et al. |
| 7,192,303 | B2 | 3/2007 | Kohen |
| 7,462,066 | B2 | 12/2008 | Kohen |
| 7,467,881 | B2 * | 12/2008 | McMillen ............... F21S 8/026 362/147 |
| 7,706,757 | B2 | 4/2010 | Luglio et al. |
| 8,123,378 | B1 | 2/2012 | Ruberg et al. |
| 8,357,016 | B2 | 1/2013 | Schumacher |
| 8,702,435 | B2 | 4/2014 | Tajima |
| 8,894,247 | B2 | 11/2014 | Kim et al. |
| 8,979,347 | B2 | 3/2015 | Holman |
| 9,901,039 | B1 | 2/2018 | Dellerson et al. |
| 9,903,576 | B2 | 2/2018 | Creasman et al. |
| 10,317,015 | B2 * | 6/2019 | Joye ...................... F21K 9/238 |
| 10,326,247 | B2 | 6/2019 | Kohen |
| 2002/0060369 | A1 | 5/2002 | Akram |
| 2002/0064380 | A1 | 5/2002 | Reiker |
| 2002/0081107 | A1 | 6/2002 | Reiker |
| 2003/0012027 | A1 | 1/2003 | Hsu |
| 2003/0107891 | A1 | 6/2003 | Kohen |
| 2004/0192415 | A1 | 9/2004 | Luglio et al. |
| 2005/0148241 | A1 | 7/2005 | Kohen |
| 2006/0141842 | A1 | 6/2006 | Sauer |
| 2006/0146527 | A1 | 7/2006 | Vanderschuit |
| 2007/0105414 | A1 | 5/2007 | Kohen |
| 2007/0167072 | A1 | 7/2007 | Kohen |
| 2008/0146064 | A1 | 6/2008 | Bankstahl |
| 2009/0035970 | A1 | 2/2009 | Kohen |
| 2009/0111322 | A1 | 4/2009 | Roland |
| 2009/0129974 | A1 | 5/2009 | McEllen |
| 2009/0280673 | A1 | 11/2009 | Kohen |
| 2010/0020550 | A1 * | 1/2010 | Kawashima ........ F21V 23/0435 362/362 |
| 2010/0301769 | A1 | 12/2010 | Chemel et al. |
| 2012/0196471 | A1 | 8/2012 | Guo |
| 2013/0040471 | A1 | 2/2013 | Gervais et al. |
| 2013/0107536 | A1 * | 5/2013 | Hiraoka ................ H05B 45/10 362/277 |
| 2014/0168944 | A1 | 6/2014 | Osada et al. |
| 2014/0225731 | A1 | 8/2014 | Gouveia |
| 2014/0263903 | A1 | 9/2014 | Ostrobrod |
| 2014/0268790 | A1 | 9/2014 | Chobot et al. |
| 2015/0009666 | A1 | 1/2015 | Keng et al. |
| 2015/0009676 | A1 | 1/2015 | Danesh |
| 2015/0044040 | A1 | 2/2015 | Oda et al. |
| 2015/0085500 | A1 | 3/2015 | Cooper |

(56) References Cited

U.S. PATENT DOCUMENTS

| | | | |
|---|---|---|---|
| 2016/0069556 A1* | 3/2016 | Li | F21V 23/06 439/230 |
| 2016/0123374 A1 | 5/2016 | Roberts | |
| 2017/0105265 A1 | 4/2017 | Sadwick | |
| 2017/0234319 A1 | 8/2017 | Seccareccia | |
| 2017/0248148 A1 | 8/2017 | Kohen | |
| 2018/0115131 A1 | 4/2018 | Kohen | |
| 2019/0312396 A1 | 10/2019 | Kohen | |
| 2020/0056773 A1 | 2/2020 | Kohen | |

FOREIGN PATENT DOCUMENTS

| | | |
|---|---|---|
| CN | 101095268 A | 12/2007 |
| CN | 102870307 A | 1/2013 |
| CN | 104033399 A | 9/2014 |
| DE | 19849101 A1 | 4/1999 |
| DE | 29923352 U1 | 8/2000 |
| DE | 20203467 U1 | 6/2002 |
| EP | 1024559 A2 | 8/2000 |
| EP | 1456914 A1 | 9/2004 |
| EP | 1789984 A2 | 5/2007 |
| IL | 126246 | 8/2001 |
| RU | 2011122686 | 10/2012 |
| RU | 2526853 | 8/2014 |
| WO | 00/16442 | 3/2000 |
| WO | 01/01047 A1 | 1/2001 |
| WO | 03/044906 A1 | 5/2003 |
| WO | 2005053100 A2 | 6/2005 |
| WO | 2005/074087 A1 | 8/2005 |
| WO | 2006031853 A2 | 3/2006 |
| WO | 2006/060772 A2 | 6/2006 |
| WO | 2006060772 A2 | 6/2006 |
| WO | 2011/020231 A1 | 2/2011 |
| WO | 2011/134709 A2 | 3/2011 |
| WO | 2011/134709 A2 | 11/2011 |
| WO | 2012/167320 A1 | 12/2012 |
| WO | 2016054159 A1 | 4/2016 |
| WO | 2016/144795 A1 | 9/2016 |
| WO | 2016144795 A1 | 9/2016 |
| WO | 2016/183354 | 11/2016 |
| WO | 2016/183354 A1 | 11/2016 |
| WO | 2016183354 A1 | 11/2016 |
| WO | 2018/165646 | 9/2018 |
| WO | 2018/165058 | 10/2018 |
| WO | 2018/195068 | 10/2018 |

OTHER PUBLICATIONS

International Preliminary Report on Patentability dated Sep. 10, 2019 for PCT/US2018/020987, filed Mar. 5, 2018.
International Search Report dated Jul. 6, 2018 for PCT/US2018/027956 filed Apr. 17, 2018.
Written Opinion dated Jul. 6, 2018 for PCT/US2018/027956 filed Apr. 17, 2018.
International Search Report dated May 17, 2018 for PCT/US2018/021919 filed Mar. 12, 2018.
Written Opinion for PCT/US2018/021919 filed Mar. 12, 2018.
International Preliminary Report on Patentability dated Sep. 10, 2019 for PCT/US2018/021919.
International Search Report dated Aug. 13, 2018 for PCT/US2018/030372 filed May 1, 2018.
Written Opinion dated Aug. 13, 2018 for PCT/US2018/030372 filed May 1, 2018.
International Preliminary Report on Patentability dated Oct. 22, 2019 for PCT/US2018/027956.
International Preliminary Report on Patentability dated Nov. 14, 2017 for International Application No. PCT/US2016/032170 filed May 12, 2016.
International Search Report dated May 14, 2018 for PCT/US2018/020987, filed Mar. 5, 2018.
Written Opinion for PCT/US2018/020987, filed Mar. 5, 2018.

International Preliminary Report on Patentability dated Nov. 5, 2019 for Internatioanl Application No. PCT/US2018/030372 filed May 1, 2018, 6 pages.
Witten Opinion for International Application No. PCT/US2018/030372 filed May 1, 2018, 5 pages.
For Chinese Patent Application No. 201580063483.2 (national stage of PCT/US2015/053138): Third Office Action, dated Sep. 18, 2019 (with English translation) Response to Third Office Action, dated Dec. 2, 2019 (13 pages).
For Chinese Patent Application No. 201580063483.2 (national stage of PCT/US2015/053138): Response to First Office Action, dated Feb. 11, 2019 (9 pages) Response to Second Office Action, dated Aug. 26, 2019 (12 pages).
For Russian Patent Application No. 2016800404661 (national stage of PCT/US2016/032170): Second Office Action, dated Dec. 2, 2019 (3 pags) Search Report, dated Nov. 24, 2019 (2 pages).
For Indian Patent Application No. 201717013438 (National Stage of PCT/US2015/053138): First Examination Report, dated Dec. 13, 2019 (6 pages).
For Russian Patent Application 2017142137 (national stage of PCT/US2016/032170): Prosecution history including decision to grant dated Oct. 25, 2019.
Office Action issued by the European Patent Office dated Dec. 19, 2019 for Application No. 16 793 548.5-1201.
Final Office Action for U.S. Appl. No. 15/515,664, dated Mar. 10, 2020.
Office Action for U.S. Appl. No. 16/443,207, dated Mar. 11, 2020.
IAEI, When continuity snaps, May-Jun. 2015.
IAEI, Supports reinforce our safety, Flanging Support Systems, Mar.-Apr. 2015.
Response filed Jan. 17, 2019, in U.S. Appl. No. 15/573,606.
Chinese Search Report dated Feb. 18, 2019 for Patent Application No. 2016800404661.
First Office Action dated Feb. 27, 2019 from Chinese Patent Office for Patent Application No. 201680040466.1.
International Search Report dated Jul. 18, 2016 for International Application No. PCT/US2016/032170 filed May 12, 2016.
Written Opinion for for International Application No. PCT/US2016/032170 filed May 12, 2016.
International Search Report and Written Opinion for PCT/US2018/21919 filed Mar. 12, 2018 (047).
International Search Report and Written Opinion for PCT/US2018/20987 filed Mar. 5, 2018.
European Search Report dated Jul. 3, 2018 for Application No. 15846948.6.
English translation of Search Report from Chinese Patent Office for Application No. 201580063483.2 dated Sep. 11, 2018.
Office Action from Chinese Patent Office for Application No. 201580063483.2 dated Sep. 25, 2018 (with English translation).
International Search Report with Written Opinion dated Jul. 6, 2018 for PCT/US2018/027956.
Office Action dated Sep. 18, 2018 in U.S. Appl. No. 15/573,606.
International Search Report with Written Opinion dated Aug. 13, 2018 for PCT/US2018/030372.
Office Action dated Sep. 25, 2018 from Chinese Patent Office for Application No. 201580063483.2.
International Search Report, Written Opinion, International Preliminary Report on Patentability for PCT/US2004/039399 filed Nov. 22, 2004.
International Search Report, Written Opinion, International Preliminary Report on Patentability for PCT/US2005/032661 filed Sep. 14, 2005.
International Search Report, Written Opinion, International Preliminary Report on Patentability for PCT/US2005/043934 filed Dec. 2, 2005.
International Search Report, Written Opinion, International Preliminary Report on Patentability for PCT/US2015/53138 filed Sep. 30 2015.
International Search Report and Written Opinion for PCT/US2016/32170 filed May 12, 2016.
European Search Report for EP05796234 dated Nov. 5, 2007 (realted to WO2006031853).

(56) References Cited

OTHER PUBLICATIONS

International Search Report for PCT/IL01/01078 filed Nov. 22, 2001.
International Preliminary Report on Patentability dated Sep. 10, 2019 with Written Opinion for PCT/US2018/021919, filed Mar. 12, 2018.
International Search Report for PCT/IL99/00499 filed Sep. 14, 1999.
European Search Report for EP 01 27 4757 dated Mar. 28, 2006.
Australian Examiner's First Report on Patent Application AU 2002221000.
Indian First Examination Report dated Jun. 24, 2010 for Indian Application No. 1677/KOLNP/2006.
New Zealand Examination Report for NZ Patent Application No. 533697 dated May 9, 2007.
For Chinese Patent Application No. 01823877.7: Notice of Allowance dated Oct. 17, 2006 Second Office Action dated Apr. 6, 2007 First Office Action dated Jul. 4, 2006.
Publication issued in the Official Gazette from Mexican Patent Application MX/a/2017/004137 dated Feb. 13, 2018, 3 pages.
European Search Report for Application No. 16793548.5 dated Feb. 14, 2019.
Second Office Action for Chinese Patent Application No. 201580063483.2, dated Jun. 14, 2019 (with translation of cover page).

\* cited by examiner

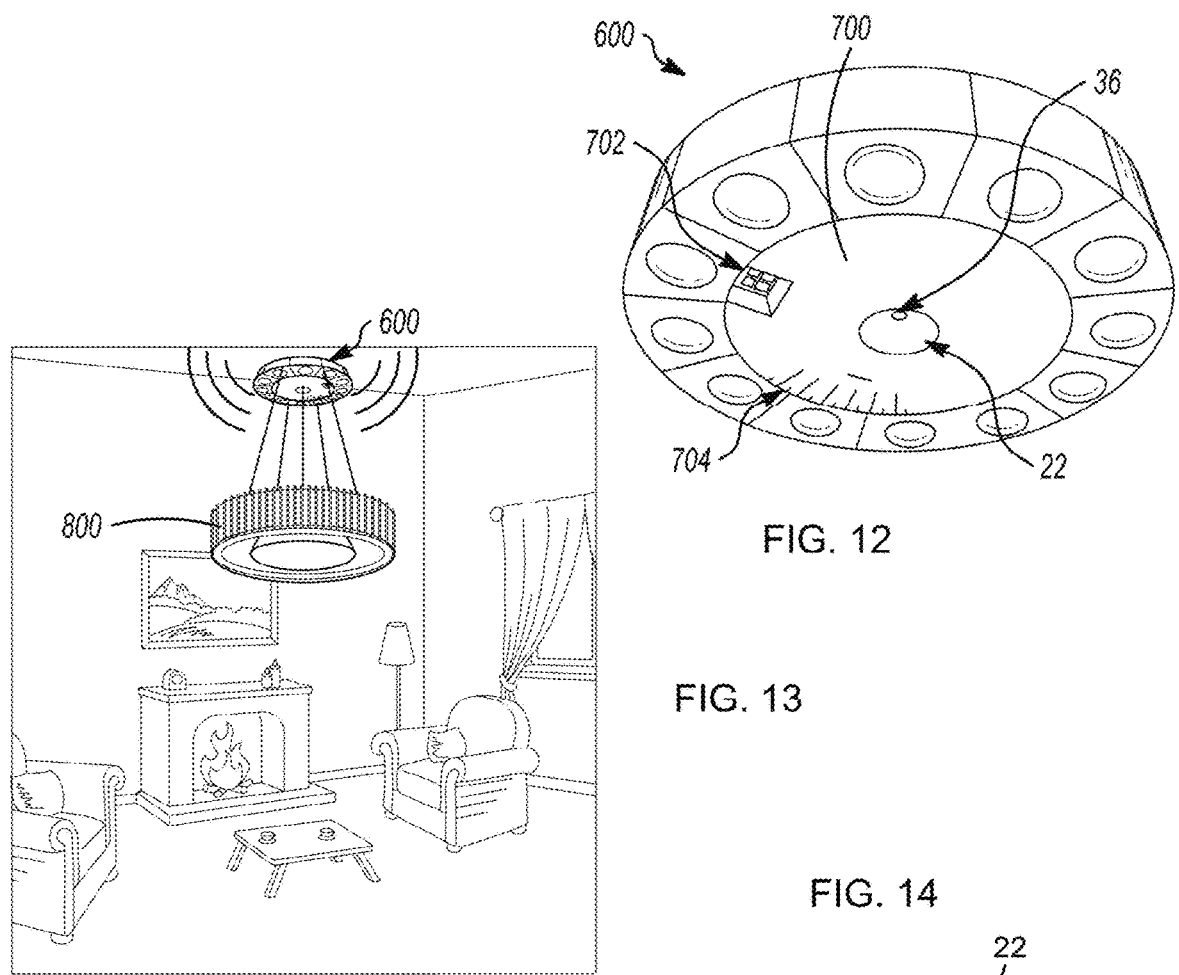
FIG. 12
FIG. 13
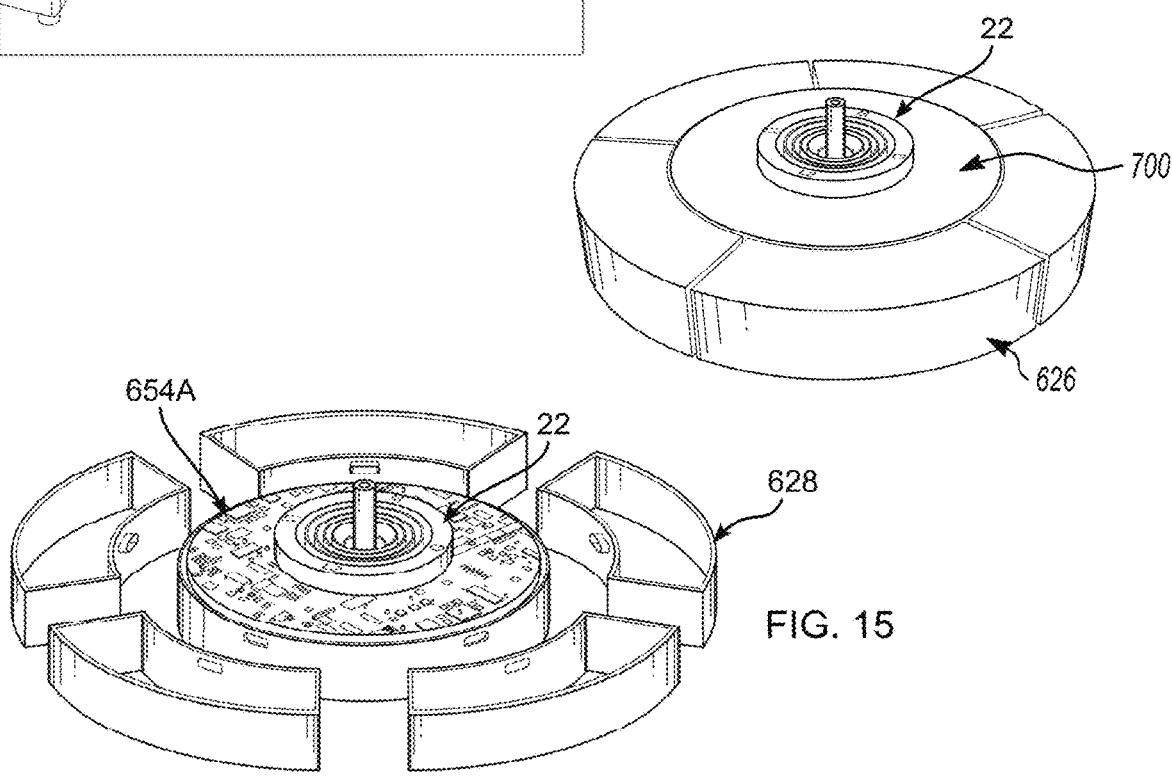
FIG. 14
FIG. 15

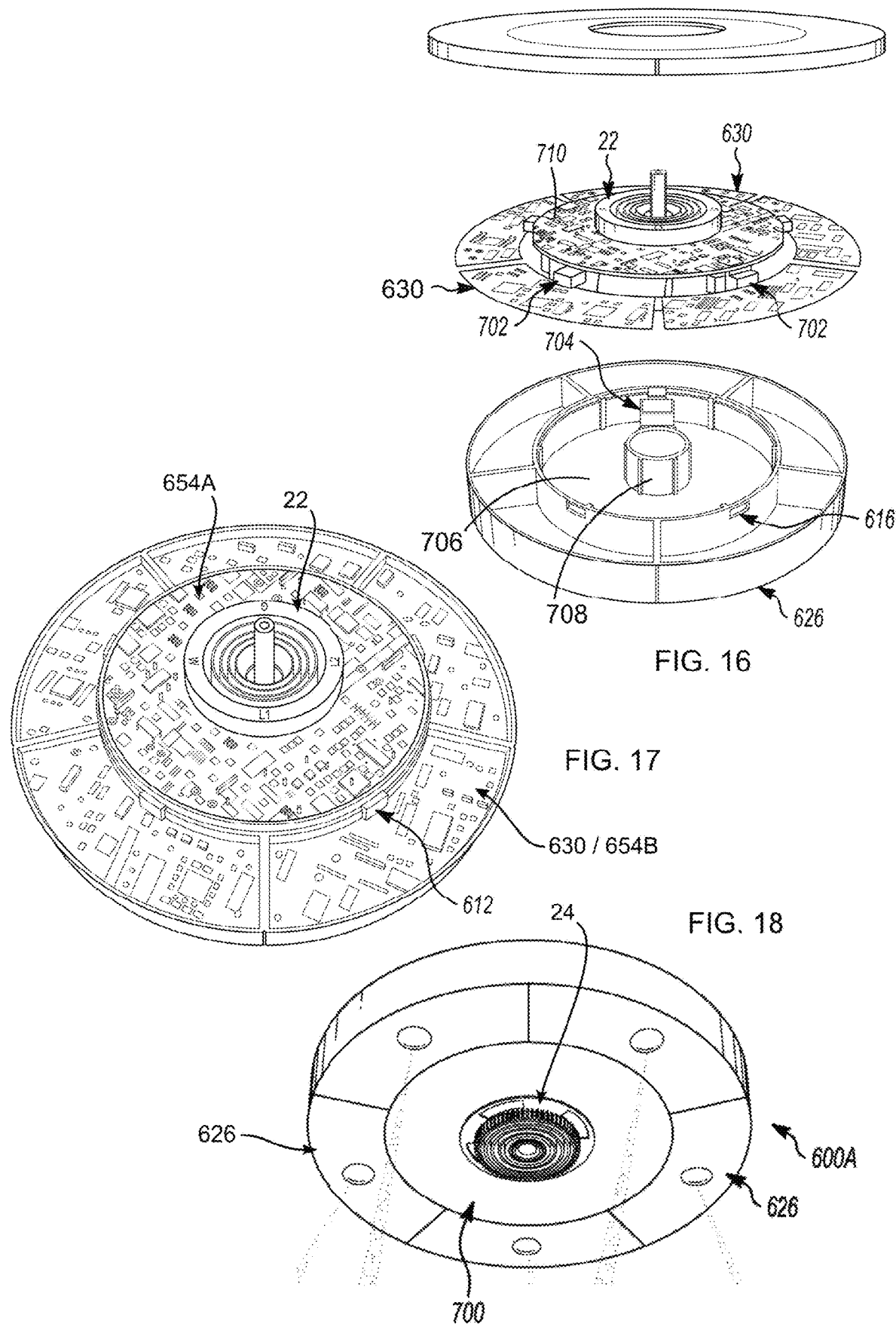

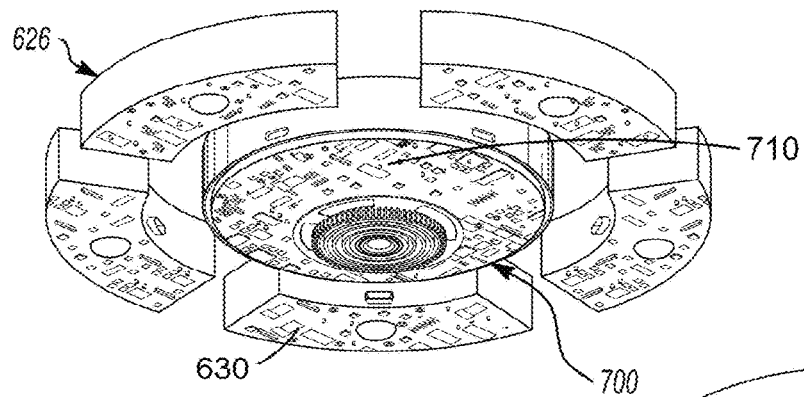
FIG. 19
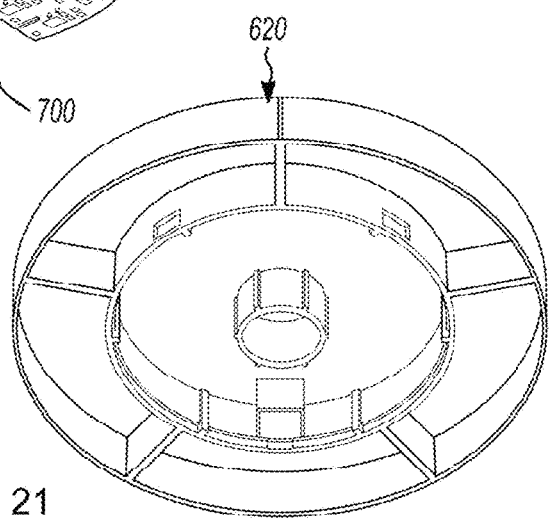
FIG. 21
FIG. 20
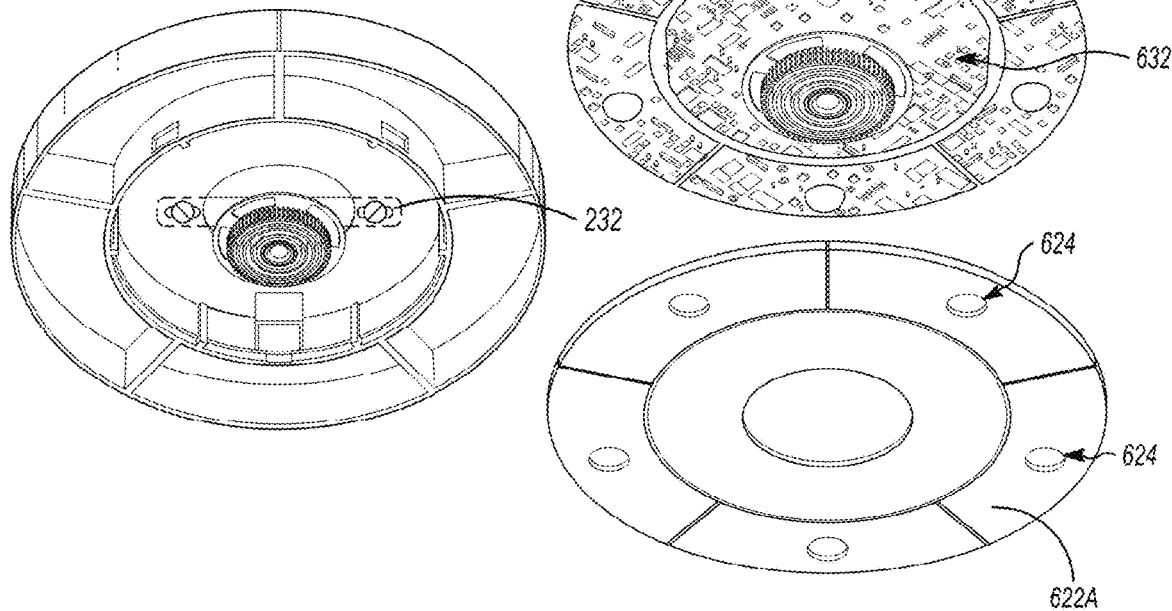

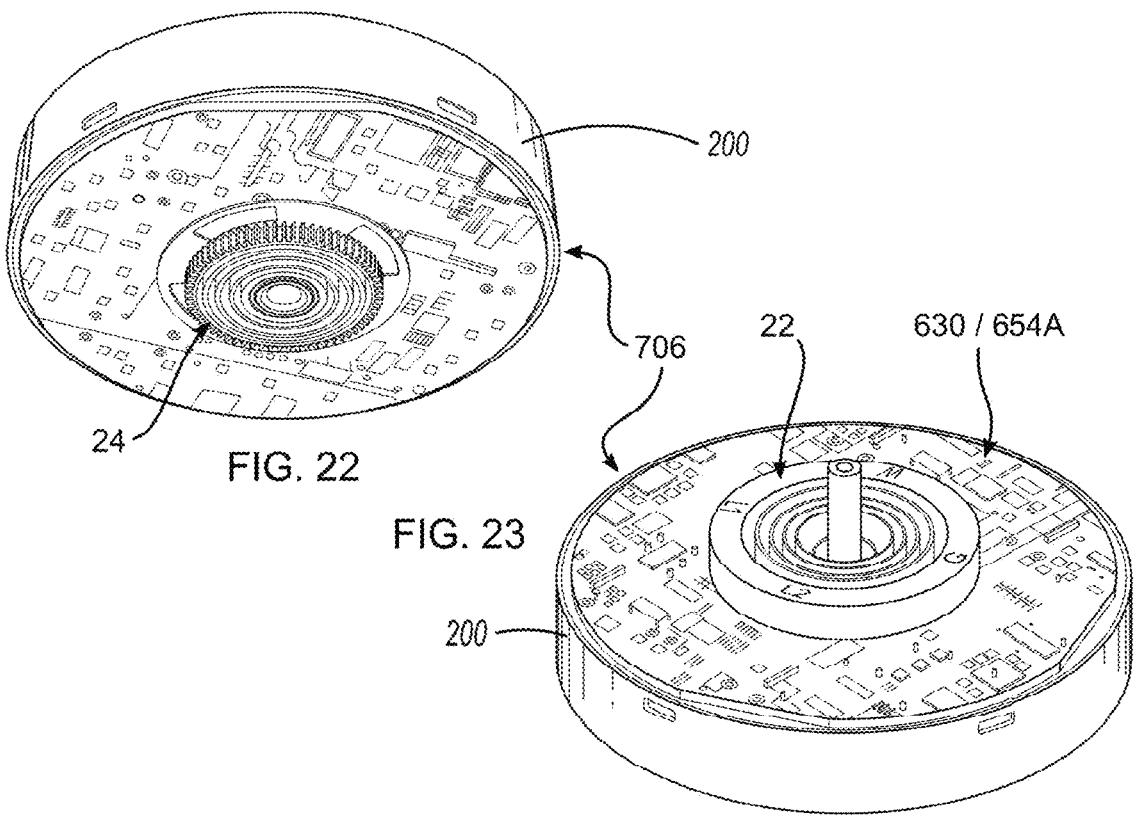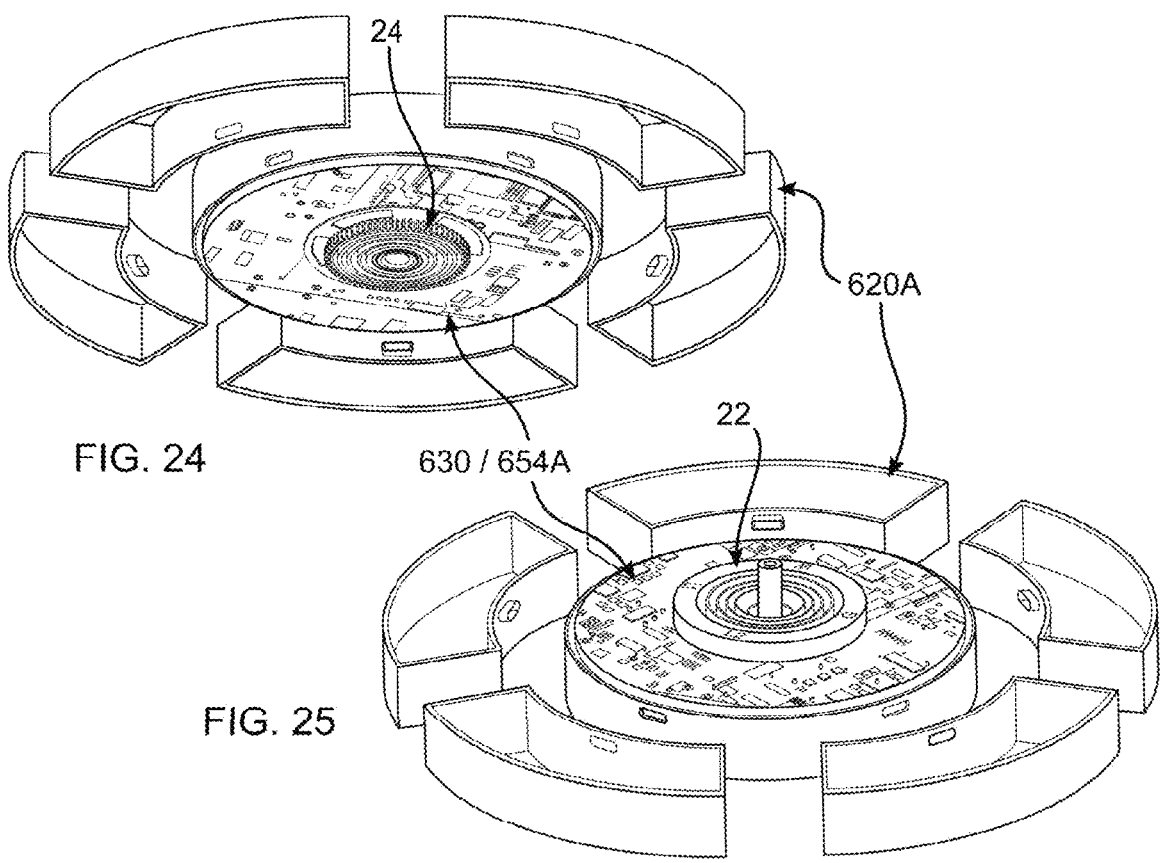

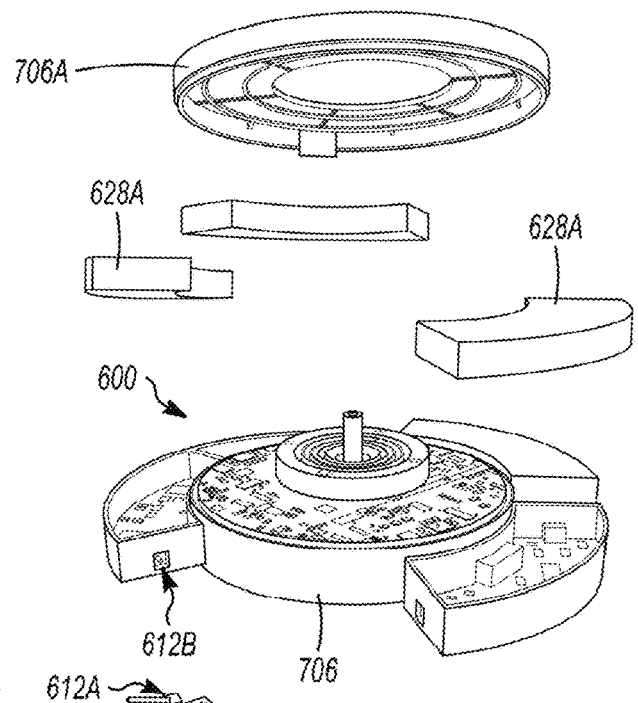
FIG. 26
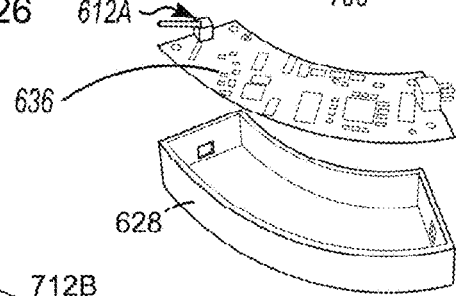
FIG. 27
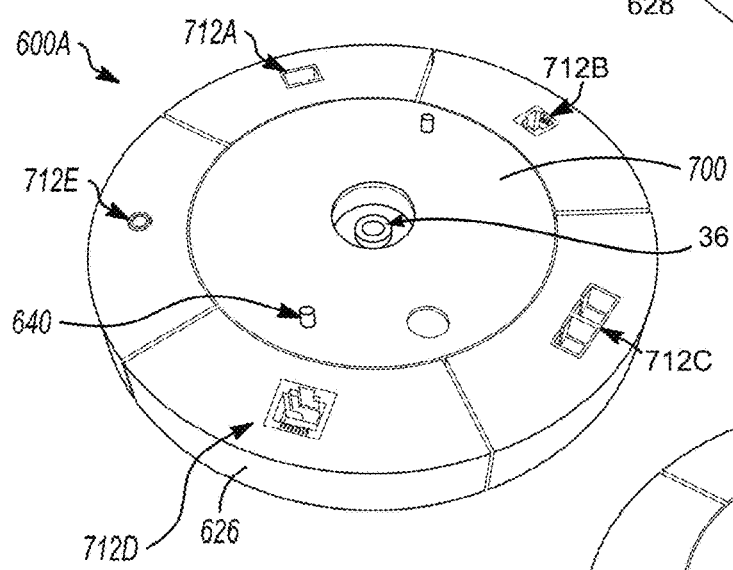
FIG. 28
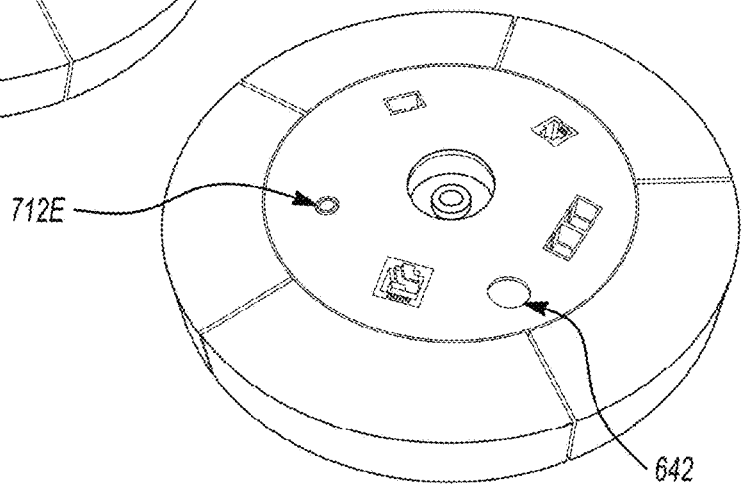

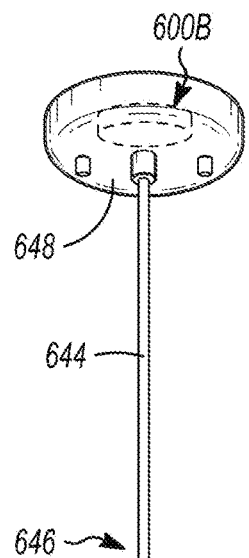
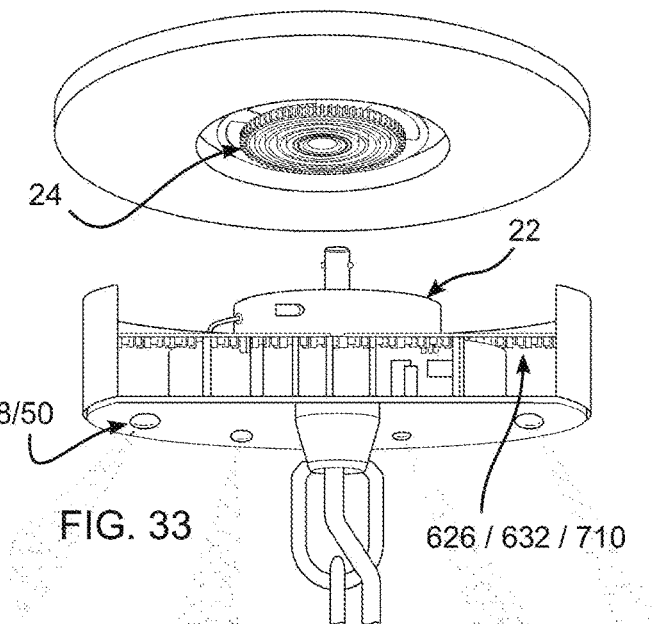
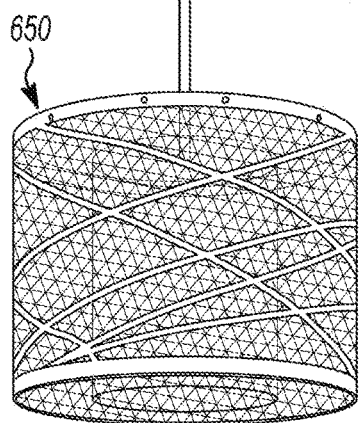
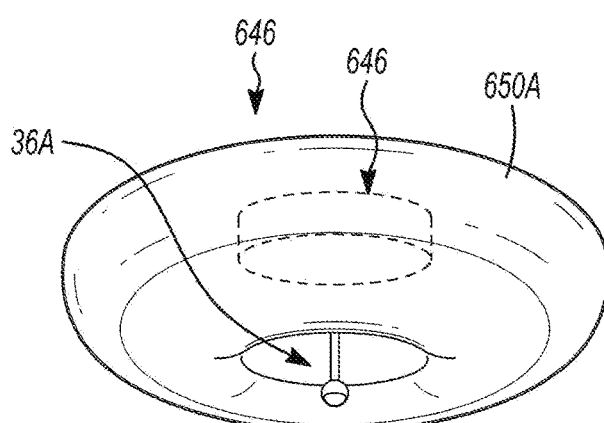
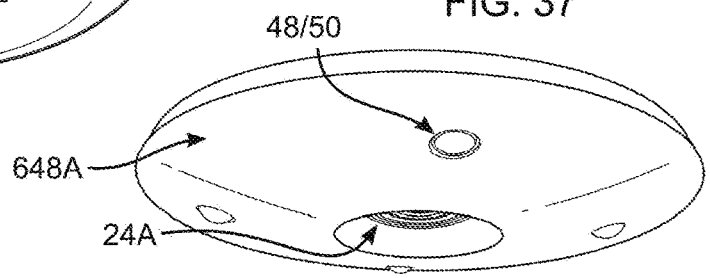
FIG. 35
FIG. 33
FIG. 34
FIG. 36
FIG. 37

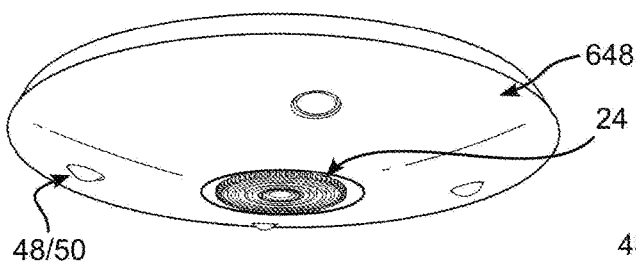
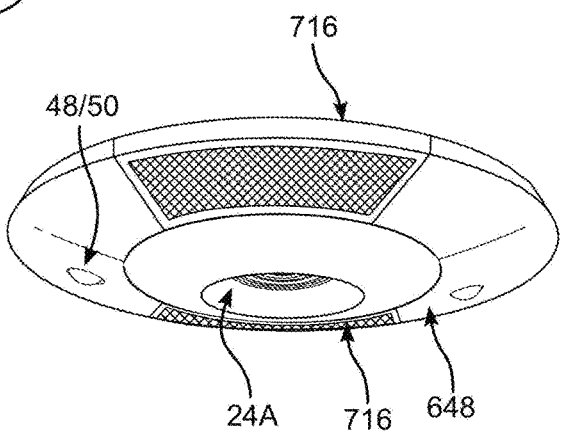
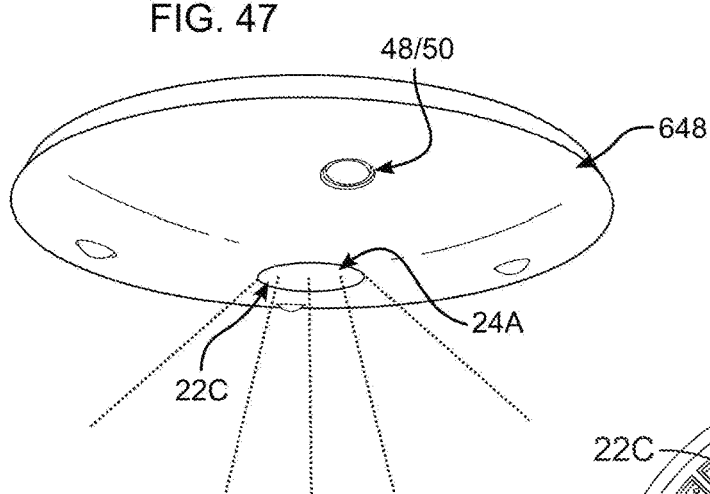
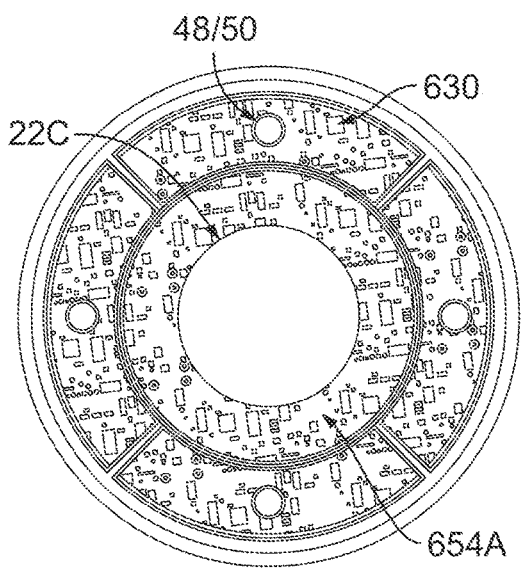
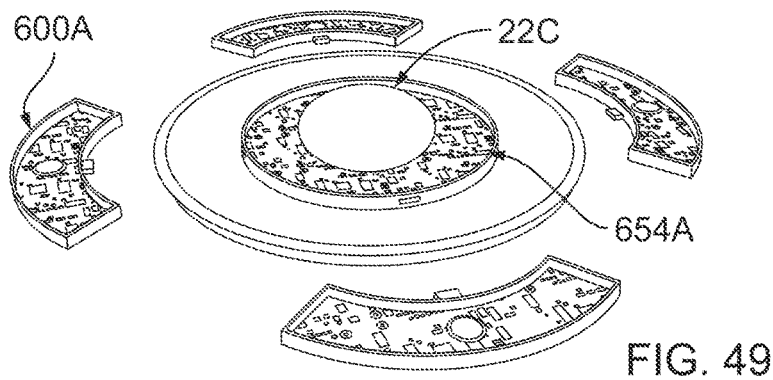

//MODULAR SMART QUICK CONNECT DEVICE FOR ELECTRICAL FIXTURES

CROSS-REFERENCE TO RELATED APPLICATIONS

This disclosure relates to U.S. Patent Application Ser. No. 62/467,176 filed Mar. 5, 2017; PCT International Patent Application No. PCT/US2016/032170 filed May 12, 2016 (published as WO 2016/183354 A1); U.S. Pat. No. 7,462,066 filed Mar. 20, 2007; U.S. Pat. No. 7,192,303 filed Dec. 2, 2004; and U.S. Pat. No. 6,962,498 filed Dec. 12, 2001; and to U.S. Patent Application Publication No. 2009/0280673 filed Dec. 2, 2005; U.S. Provisional Applications 62/160,585 filed May 12, 2015; 62/308,718, filed Mar. 15, 2016; 62/515,464 filed Jun. 5, 2017; 62/543,912 filed Aug. 10, 2017; 62/470,170 filed Mar. 10, 2017; and 62/515,464, filed Jun. 5, 2017, the contents of all of which are hereby incorporated by reference herein, in their entirety.

FIELD OF THE DISCLOSURE

The disclosure relates to smart electrical connectors and fixtures, and more particularly to an electrical plug and socket combination enabling tool-less connection and mounting of electrical fixtures at electrical outlets, the connector and/or fixtures including electronic sensors, controls, and/or communication devices.

BACKGROUND OF THE DISCLOSURE

There are a number of commercially available systems termed 'smart-home environment' systems, which can include one or more sensors and network-connected devices. These smart-home devices can sometimes intercommunicate and integrate together within the smart-home environment. The smart-home devices may also communicate with cloud-based smart-home control and/or data-processing systems in order to distribute control functionality, to access higher-capacity and more reliable computational facilities, and to integrate a particular smart home into a larger, multi-home or geographical smart-home-device-based aggregation.

Techniques for installing electrical fixtures and appliances such as lighting fixtures and fans on walls or ceilings usually require the assistance of a qualified electrician, and the use of a variety of tools and specialized hardware. The procedure for installing or uninstalling such fixtures can also be relatively time consuming, even when performed by an experienced installer, and can be hazardous. In addition to the need for hand-wiring the necessary electrical connections between the fixture and electrical power supply wiring, the installer must make separate mechanical connections for supporting or suspending the fixture in place.

SUMMARY OF THE DISCLOSURE

In an embodiment of the disclosure, a device for connecting an electrical fixture to an electrical socket of the type including a socket body having an internal cavity which contains one or more electrically conductive and concentric ring-shaped contact terminals which are electrically connected to an electrical power supply wiring, the device including a plug rigidly fixed to the fixture and insertable into the socket, the plug having one or more male connectors electrically connected to the fixture and mateable with the one or more contact terminals within the socket to establish a circuit between the electrical fixture and the electrical power wiring; and a releasable latch carried on the combination of the plug and the socket for releasably mounting the fixture on the support, the device comprising a hub surrounding the plug; a plurality of sensor modules releasably connectable to a periphery of the hub, the sensor modules each including an electronic device operative to receive or transmit electronic data.

In variations thereof, the device further includes a central electronics board positioned within the hub, each of a plurality of the sensor modules electrically connectable to the central electronics board when the respective sensor module is connected to the periphery of the hub; a plurality of sensor modules are mutually electrically connectable using a wired connector, when the sensor modules are connected to the periphery of the hub; and/or the hub is circular, and sensor modules include a circuit board having an arcuate shape corresponding to a radius of the hub.

In other variations thereof, at least one sensor module wirelessly communicates a sensed condition; at least one sensor module wirelessly receives a signal; the signal is a command signal to control the device and/or an associated electrical fixture; and/or the command signal results from the sensed condition.

In further variations thereof, the device further includes a sensing module includes a transmitting sensor for receiving at least one of an RF, Wi-Fi, and Bluetooth sensor; a sensing module detects an environmental condition including at least one of temperature, humidity, smoke, carbon monoxide, motion, and presence; a sensing module includes at least one of a security camera, glass breakage detector, motion/presence detector, and emergency lighting; the sensor modules include a housing; the housing includes an access opening; and/or the sensor modules are releasably connectable to the hub using at least one of magnet, hook and loop fastener, sliding dovetail connection, interference fit, snap connection, one or more screws, adhesive, or a mechanical connection formed by an electrical connector.

In a further embodiment of the disclosure, a device for connecting an electrical fixture with electrical power supply wiring, and for mounting the fixture on a support, comprises a socket including a socket body having at least one internal cavity therein; a plurality of electrically conductive concentric ring-shaped contact terminals disposed within the cavity for establishing an electrical connection between the electrical power supply wiring and the socket; a plug rigidly fixed to the electrical fixture and insertable into the socket, the plug having a plurality of concentric ring-shaped contact terminals mateable with the plurality of contact terminals within the cavity of the socket in order to establish a circuit between the electrical fixture and the electrical power wiring; a releasable latch carried on the combination of the plug and the socket for releasably mounting the fixture on the support; and a sensing unit for at least one of wirelessly communicating a sensed condition and wirelessly receiving a signal, the sensing unit electrically coupled to at least one of the plug and socket.

In a variation thereof, the socket defining a mating plane, the plug mateable with the socket by inserting the plug into the socket at any radial angle lying on the mating plane.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein:

FIG. 12 depicts the device of FIG. 1, including 7 additional replaceable modules;

FIG. 13 depicts a device of the disclosure in a domestic environment, including sensors and a pendent lamp fixture;

FIG. 14 depicts a combination device including a plug extending from back and front sides (only the front visible);

FIG. 15 is an exploded view of the device of FIG. 10, with the replaceable modules removed;

FIG. 16 is an exploded view of the device of FIG. 5, illustrating a central electronics board connected to discrete electronics boards associated with each replaceable module, and a housing;

FIG. 17 depicts the device of FIG. 5, assembled, and with a top cover removed;

FIG. 18 depicts a front view of a detachable electrical device including replaceable modules connected to a central hub, in accordance with the disclosure, the front including a socket for attaching an electrical fixture;

FIG. 19 depicts the device of FIG. 10, with a top cover and replaceable modules removed, and showing electronics boards associated with the central hub and replaceable modules;

FIG. 20 depicts a housing of the device of FIG. 10, including a strap for connecting the housing and the plug to an electrical box;

FIG. 21 is an exploded view of the device of FIG. 10, showing a housing, electronics boards of the hub and replaceable modules, sensors, and a top cover;

FIG. 22 depicts the central hub, with replaceable modules removed, of the device of FIG. 10;

FIG. 23 depicts the central hub, with replaceable modules removed, of the device of FIG. 16;

FIG. 24 depicts the central hub of FIG. 22, with the replaceable modules disconnected, and showing a housing of the replaceable modules;

FIG. 25 depicts the central hub of FIG. 23, with the replaceable modules disconnected, and showing a housing of the replaceable modules;

FIG. 26 depicts an exploded view of a device similar to the device of FIG. 23, showing end connectors associated with the replaceable modules, and removable covers for the hub and the replaceable modules;

FIG. 27 depicts an attachable electrical device of the disclosure including standard electrical signal connectors attachable to signal cables during installation in an edifice, the connectors each positioned and associated with a removable module;

FIG. 28 depicts an attachable electrical device of the disclosure including standard electrical signal connectors attachable to signal cables during installation in an edifice, the connectors each positioned and associated with a central hub;

FIG. 33 is a cutaway view of an attachable electrical device of the disclosure, which has been mounted within a lamp canopy;

FIG. 34 depicts an attachable electrical device of the disclosure, having connectors as in the embodiment of FIG. 33, but including a reduced component set which includes a receive/input device and a transmit/output device, for relaying signals in the manner of a router, extender, and or modem;

FIG. 35 depicts the device of FIG. 34, disposed within the lamp canopy of a hanging lamp;

FIG. 36 depicts the device of FIG. 34, disposed within a lamp mountable to a ceiling;

FIG. 37 depicts a device of the disclosure including a dome shaped canopy housing a recessed socket of the disclosure;

FIG. 45 depicts a device of the disclosure including a canopy housing sensors, and a socket that is disposed flush with a surface of the canopy;

FIG. 46 depicts a device of the disclosure including replaceable modules with sensors or with speakers;

FIG. 47 depicts a device of the disclosure with a recessed socket, and a plug having a light associated with the plug that has been inserted into the recessed socket, the device further including sensors associated with removable modules;

FIG. 48 depicts a front view of the device of FIG. 47, with the canopy removed;

FIG. 49 is an exploded view of the device of FIG. 47;

DETAILED DESCRIPTION OF THE DISCLOSURE

Figure 1:
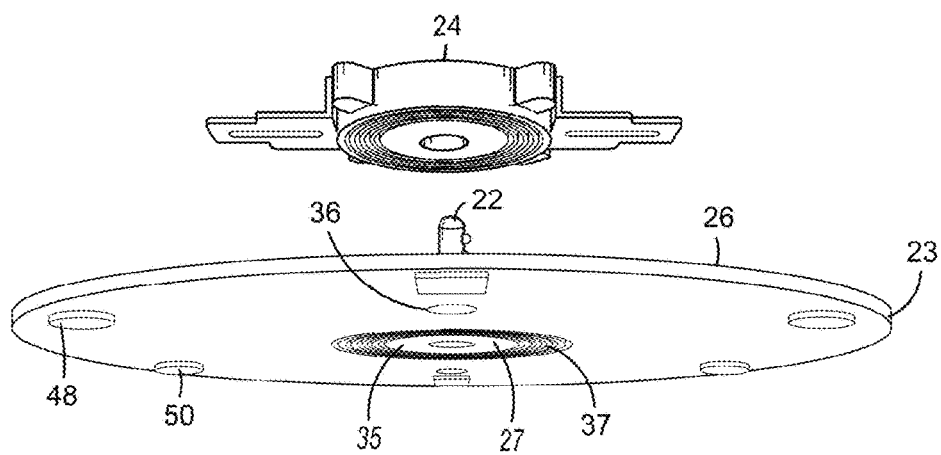
FIG. 1 is a perspective view of a combination socket and plug device with a sensing unit prior to connecting to an existing socket of a quick connect device for retrofitting the existing quick connect device, resulting in a smart quick connect device.

As required, embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically.

The disclosure herein relates to the inventor's prior work, such as that set forth above in the documents identified in the Related Patents and Applications section, the contents of each of which are herein incorporated in their entirety by reference.

A "quick connect device" for installing electrical fixtures comprises the combination of a plug and mating socket. The plug and mating socket of the device function to both establish an electrical connection between an electrical fixture and electrical supply wiring, and mechanically support the fixture on a surface or base, typically a wall, ceiling or floor surface. As used herein, the term "fixture" or "electrical fixture" means any fixture or appliance such as a lighting fixture, ceiling fan, television camera, security device or any other device which is powered by electricity supplied by electrical wiring, and which requires a mechanical connection to support or suspend the fixture. The plug is fixedly secured to an electrical fixture, while the socket is secured to either the surface (e.g., wall, ceiling or floor) on which the fixture is to be mounted, or to an electrical junction box. The structure, function, and operation of the plug and mating socket have already been detailed in, for example, the patents and application incorporated by reference herein.

A "smart quick connect device" of the disclosure is generally defined as a connector with additional functionality in addition to the traditional capability of providing a connection. A smart quick connect device may include a sensing unit for wirelessly communicating a sensed condition. Alternatively or in addition, a smart quick connect device can include a sensing unit for wirelessly receiving a signal. The signal can be a command signal to control the smart quick connect device and/or the associated electrical fixture. The command signal can be independent of or as a result of the sensed condition.

Referring for example to the incorporated reference published as PCT/US2016/032170 (the "'170 publication"), a quick connect device 20 for installing electrical fixtures comprises the combination of a plug 22 and mating socket 24 with a sensing unit 26. A detailed description of the structure and function plug 20 and 22 is provided in the '170 publication and other incorporated references, and is therefore not described in detail herein. As in the '170 publication, one or more sensors or other receiving/input or transmitting/output electronic or electrical devices 48, 50 (hereinafter 'sensors') have been associated with either plug 22 or socket 24. In the instant disclosure, these sensors are configured to be replaceable within an assembly 600 including modular sensor modules 626, enabling a variable configuration of sensors.

The plug 22 and mating socket 24 of the device 20 function to both establish an electrical connection between an electrical fixture and electrical supply wiring, and mechanically support the fixture on a surface or base, typically a wall, ceiling or floor surface. As used herein, the term "fixture" or "electrical fixture" means any fixture or appliance such as a lighting fixture, ceiling fan, television camera, security device or any other device which is powered by electricity supplied by electrical wiring, and which requires a mechanical connection to support or suspend the fixture. Plug 22 is fixedly secured to an electrical fixture (not shown), while the socket 24 is secured to either the surface (e.g., wall, ceiling or floor) on which the fixture is to be mounted, or to an electrical junction box. It should be further understood that the choice of using a socket 24 for a base reflects that electrical conductors carrying dangerous electrical signals should be recessed and not touchable by people. However, where exclusively low voltage/low power signals are being used, the locations of plug and socket can be reversed or arbitrarily chosen.

Figure 2:
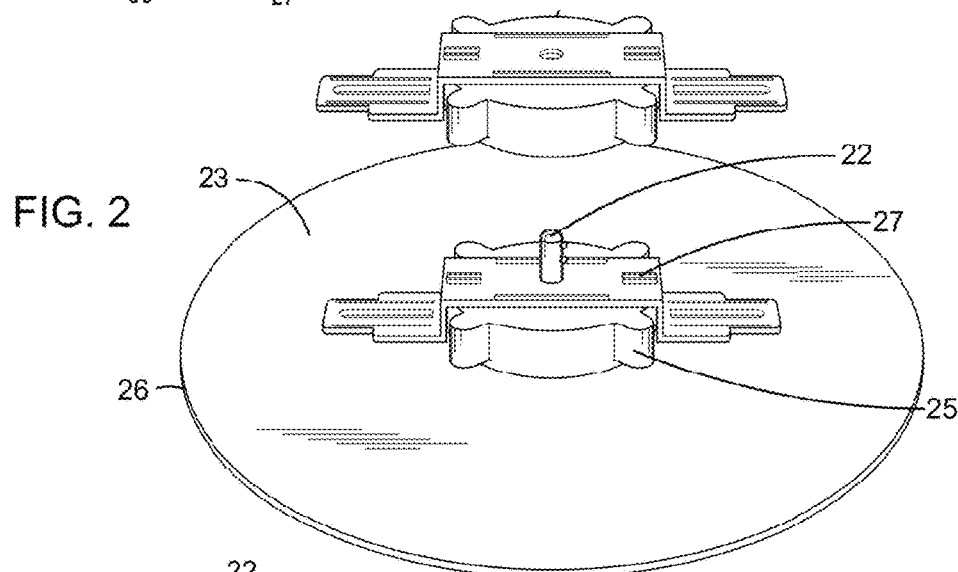
FIG. 2 is a back view of the combination device and existing socket of the quick connect device of FIG. 1.
Figure 3:
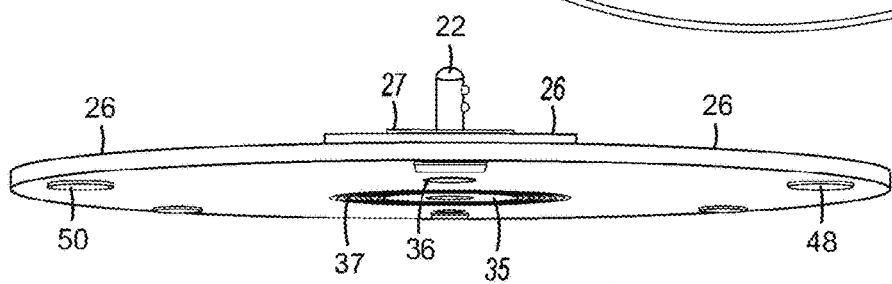
FIG. 3 is a side view of the combination device and existing socket of the quick connect device of FIG. 1.

Referring generally to FIGS. 1-3, a "conventional" socket 22 of a "conventional" quick connect device for installing electrical fixtures ordinarily receives a "conventional" plug. Instead and in accordance with the disclosure, a combination device 23 is configured and dimensioned to mate with socket 22. Combination device 23 includes a spindle assembly 22 as found in a "conventional" plug for releasably mechanically connecting combination device 23 to socket 22. Combination device 23 also includes a body 25 formed out of non-conductive material and has on a first side 27 concentric, male connector rings (not shown, but analogous to those found in a "conventional" plug) integrally molded into the body 25, with sufficient radial spacing therebetween to electrically insulate them from each other. The diameters and spacing of the male connector rings are such that they are alignable with and receivable within corresponding female recesses in the socket 22. As detailed in the patent publications incorporated by reference, this alignment electrically connects the combination device 23 to the socket 22.

One or more push buttons 36, which are mechanically coupled to spindle assembly 22, provides a means of actuating spindle assembly 22 using either a finger or a tool.

Combination device 23, which receives electricity from socket 22, is electrically coupled to a sensing unit 26. Sensing unit 26 is provided with one or more sensors 48, 50. Sensors 48 are receiver sensors, for receiving a signal. Non-limiting examples of the signals that can be received are set forth below. Sensors 50 are transmitter sensors, for transmitting a signal. Non-limiting examples of the signals that can be transmitted are also set forth below. Sensors 48, 50 can be mounted on any surface of sensing unit 26, depending on the application.

Depending on sensors 48, 50, sensing unit 26 can allow operation of device 23 with a hand held remote using, for example, RF, Wi-Fi, or Bluetooth. Again, depending on sensors 48, 50, environmental conditions such as a temperature sensor, a humidity sensor, smoke and CO sensors, and/or motion/presence detection can be determined. In this regard, sensing unit 26 can be used as part of a security system, with sensors 48, 50 being a security camera (with or without motion activation), glass breakage detector, motion/presence detector, and/or emergency lighting (with battery backup).

Several different circuit boards for sensing unit 26 were developed that are intended to attach to and integrate with the combination device 23 and each one has varying amounts of circuitry and function depending upon the intended usage. Exemplary circuits and concepts are described in the patent publications incorporated by reference in general without a distinction of which board exactly contains which function.

A second side 35 of body 25 includes concentric, ring shaped, female recesses or slots 37. These slots are electrically coupled to the male connector rings on the first side 27 of body 25 and are configured to matingly receive male connector rings on the plug (not shown) attached to an electrical fixture to establish electrical connections to the fixture.

As is evident for the above disclosure, the combination device 23 functions to both establish an electrical connection between an electrical fixture and electrical supply wiring, and mechanically support the fixture on a surface or base, typically a wall, ceiling or floor surface.

Figure 4:
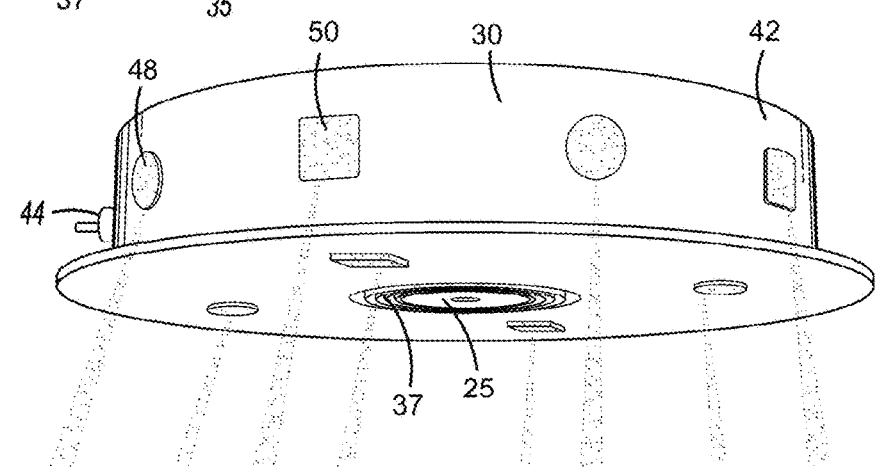
FIG. 4 is a perspective view of another embodiment of a combination socket and plug device with a sensing unit connected to an existing socket of a quick connect device, resulting in a smart quick connect device.
Figure 5:
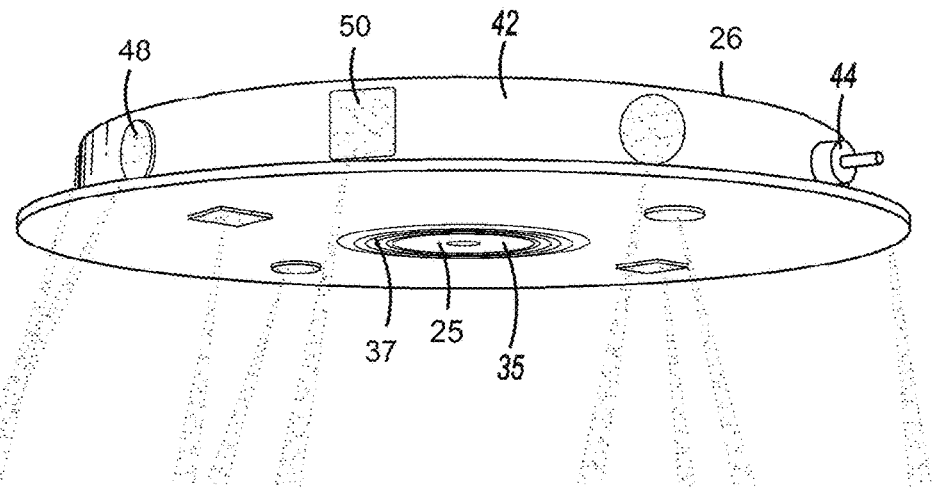
FIG. 5 is another perspective view of the combination device of FIG. 4.

FIGS. 4 and 5 show another embodiment of a combination device 42 already mechanically and electrically connected to a "conventional" socket. The combination device 42 includes a switch 44 to turn on or off the sensing unit 26. Alternatively or in addition, switch 44 can turn on or off all electricity to combination device 42. As sensing unit 26 (and/or combination device 42) can be controlled remotely through, for example, an app on a mobile phone, switch 44 functions as an override.

Figure 6:
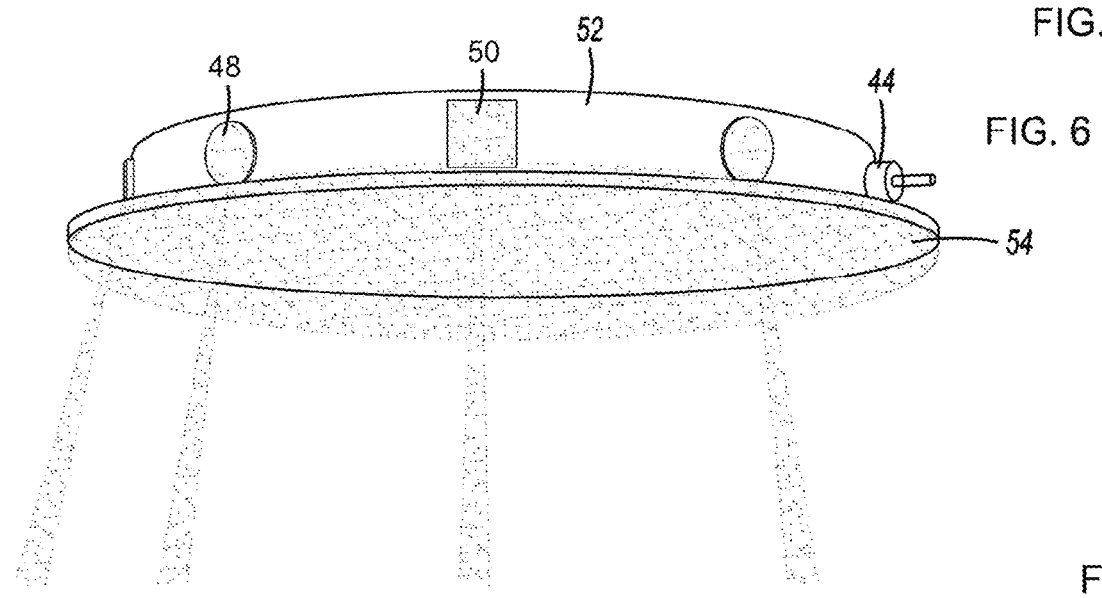
FIG. 6 is a perspective view of another embodiment of a combination socket and plug device with a sensing unit connected to an existing socket of a quick connect device, resulting in a smart quick connect device.

FIG. 6 shows another embodiment of a combination device 52 with an LED fixture 54 already connected to combination device 52. As noted above, the disclosure contemplates fixtures other than LED fixture 54 connected to any of the combination devices of the disclosure.

Figure 7:
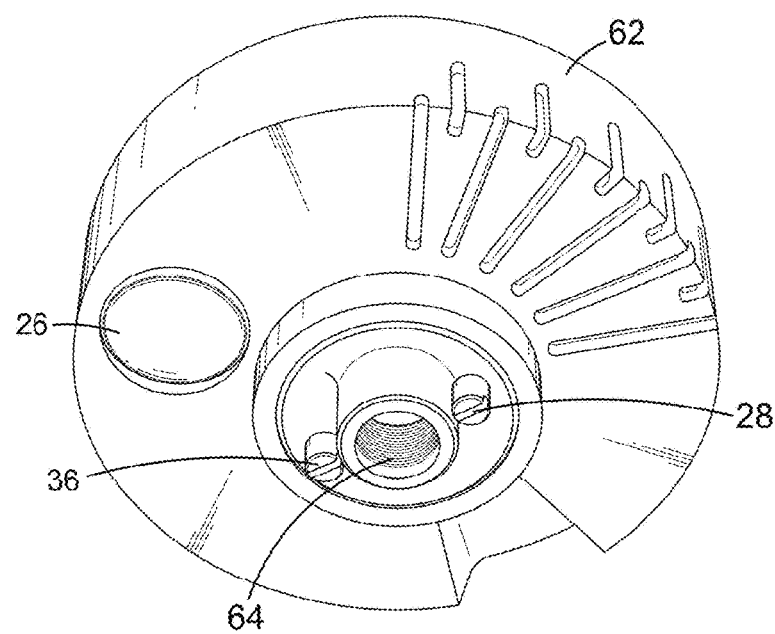
FIG. 7 is a perspective view of an embodiment of a plug device with a sensing unit connected to an existing socket of a quick connect device, resulting in a smart quick connect device.

FIG. 7 shows an embodiment of a smart quick connect device plug 62. For plug 62, the fixture to mechanically coupled through threaded bore 64. The fixture wiring is fed through threaded bore 64 and electrically connected to plug 62. Plug 62 is mechanically and electrically connected to a "conventional" socket.

Figure 8:
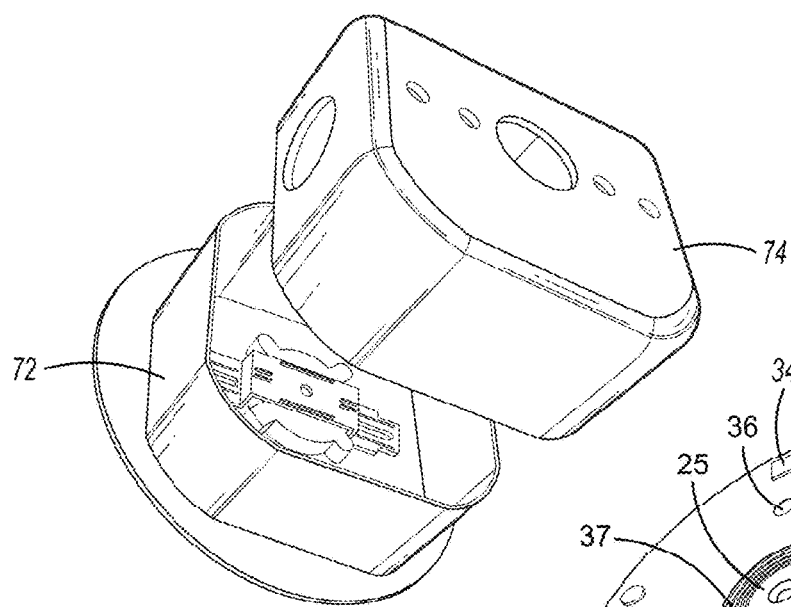
FIGS. 8-9 are perspective views of an embodiment of a socket with a sensing unit and junction box.
Figure 9:
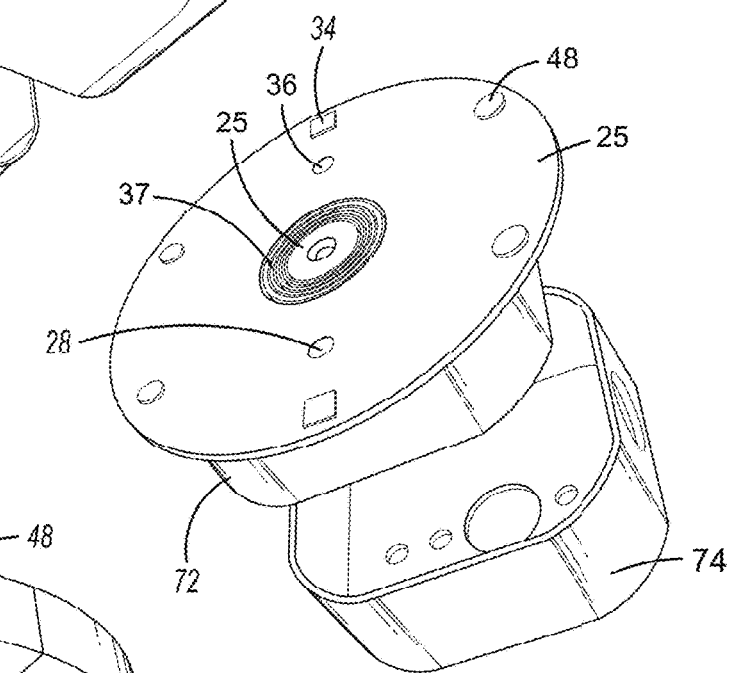
Figure 10:
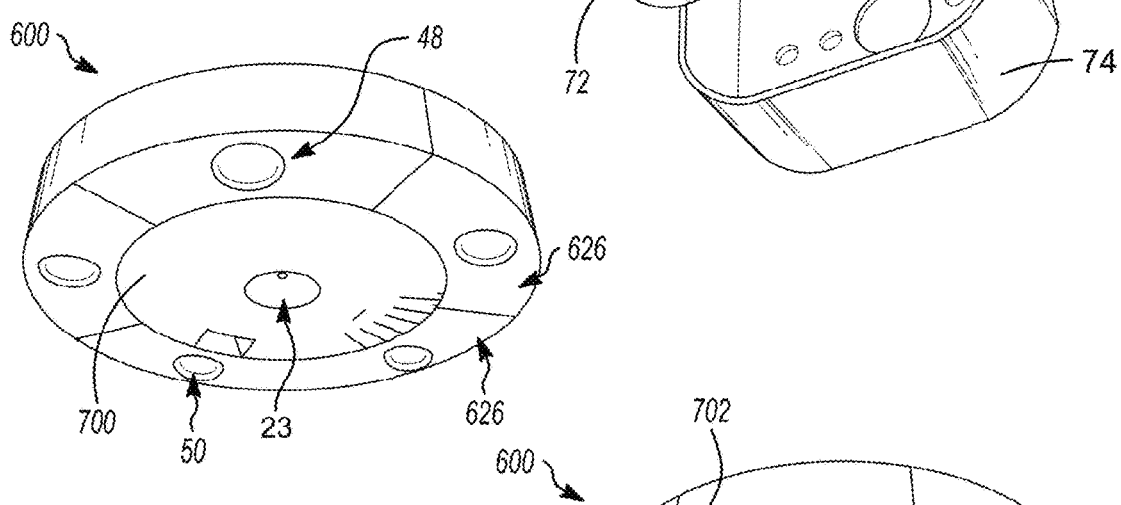
FIG. 10 depicts a front view of a detachable electrical device including replaceable modules connected to a central hub, in accordance with the disclosure.
Figure 11:
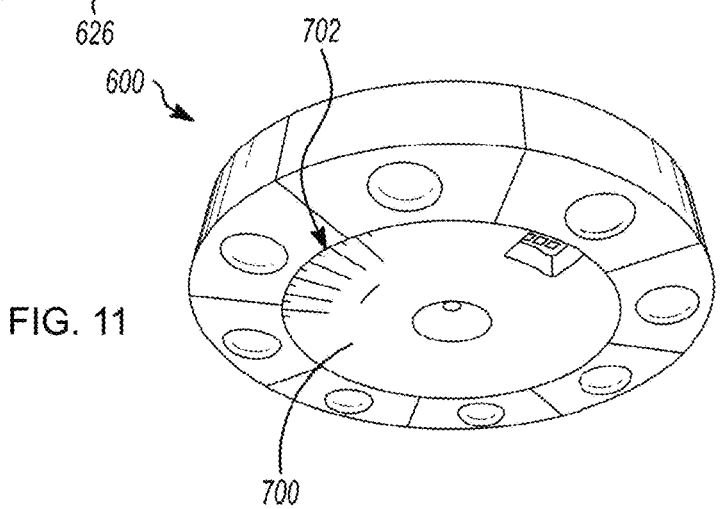
FIG. 11 depicts the device of FIG. 1, including 3 additional replaceable modules.

FIGS. 8-9 show an exploded view of a socket 72 and a standard electrical junction box 74. Any of a wide variety of devices can be connected to socket 72 (or any of the combination devices and plugs disclosed herein), including any of a fixed or PTZ (pan tilt zoom) camera; fan; video projector; hanging display which can be illuminated; video display; chandelier; camera housing; smoke detector; video intercom; wall sconce with individual or multiple heads; toys and moving objects; emergency lighting; outdoor lighting; exit sign; decorative lighting; interface to smartphone, tablet, or other computing device; sensing unit as described herein, or other devices or sensors as described herein.

Sensing unit 26 can function to provide the sensing, communications, transmission, and other functions as described herein. These functions can include any or all of, for example, BLUETOOTH communication of information; WiFi communication, for example with a function of hub, router, access point, or relay; a motion sensor to detect movement, or an infrared sensor to detect the presence of humans or animals, useable for example to control an HVAC system or to provide input for an alarm or monitoring system; thermostat; camera for communication, or for an alarm or monitoring system; speaker; smoke detector; fire detector; occupancy detector using any of a variety of appropriate sensors, such as motion, infrared, audio, image detection, image recognition, or air pressure; humidity sensor, for example to protect art or identify leaks or water intrusion; and a power consumption meter to detect intrusion or to improve efficiency; and smoke and/or air quality sensors. Herein, for brevity, the term 'sensor' is used to collectively refer to any device which can carry out one or more of the foregoing functions, and it should therefore be understood that a 'sensor' herein can sense a condition, actuate, transmit, receive, both send and receive, or is otherwise configured to carry out any of the foregoing functions.

Devices of the disclosure equipped with sensing units 26 can form part of a "smart home" architecture and operation, such as are made by GE and other companies. Accordingly, the electronic board(s) of sensing unit 26 can be provided with electronic circuitry, including an electronic processor, memory, storage, and other components which can enable programming and remote operation associated with such a function. Remote operation can include a central programming or control program which controls the functioning of a device of the disclosure. This can include, for example, control from a website, or control from an app executing upon a smartphone or tablet. Alternatively, a handheld TV/DVR style remote control device can be used.

Devices of the disclosure can include one more sensors which can function as any or all of intelligent thermostats, intelligent hazard-detection unit, intelligent entryway-interface device, smart switch, including smart wall-like switches, smart utilities interface or interface to other service, such as smart wall-plug interface, and a wide variety of intelligent, multi-sensing, network-connected appliances, including refrigerators, televisions, washers, dryers, lights, audio systems, intercom systems, mechanical actuators, wall air conditioners, pool-heating units, irrigation systems, and many other types of intelligent appliances and systems.

Devices of the disclosure can include one or more different types of sensors, one or more controllers and/or actuators, and one or more communications interfaces that connect the smart-home devices to other smart-home devices, routers, bridges, and hubs within a local smart-home environment, various different types of local computer systems, and to the Internet, through which a smart-home device may communicate with cloud-computing servers and other remote computing systems. Data communications can be carried out by sensors 48, 50 and board 52 using any of a large variety of different types of communications media and protocols, including wireless protocols, such as Wi-Fi, ZigBee, 6LoWPAN, various types of wired protocols, including CAT6 Ethernet, HomePlug, and other such wired protocols, and various other types of communications protocols and technologies. Devices of the disclosure can integrate with each other, or with previously known so-called 'smart-home' devices, and may themselves operate as intermediate communications devices, such as repeaters, for smart-home devices and other devices of the disclosure. A smart-home environment including devices of the disclosure can additionally include a variety of different types of legacy appliances and devices which lack communications interfaces and processor-based controllers.

A partial list of input sensors 48 that can be incorporated into the various devices of the disclosure includes, but is not limited to, the following examples:

a. zero voltage crossing—used to determine when to trigger TRIACs/IGBTs to control power delivered to attached loads;

b. communications (WiFi, Bluetooth, nRF24)—used to wirelessly receive incoming commands from remote control of output devices, and wife repeaters;

c. microphone—used for room occupancy detection, or for voice recognition, including carryout out commands by voice;

d. motion detection used for room occupancy detection or intrusion, and to issue or signal an alarm;

e. temperature and humidity sensors—used to make heating/cooling changes;

f. smoke and/or gas detectors, including detectors responsive to the presence of carbon monoxide (CO), propane and other fuels, radon, or any other gas or volatile element, and which can be used to signal or provide an alarm, and which can be used to take emergency/warning actions;

g. glass breakage detectors—used to control security devices;

h. detectors for dangerous substances;

i. a light dimmer;

j. sensors for detecting movement or sounds, including for example waving or clapping or other noises, which can be used to change a light level or other environmental parameter.

A partial list of output sensors 50 includes, but is not limited to, the following:

A. triacs/IGBTs . . . used to control fan and lights;

B. communications (WiFi, Bluetooth, nRF24), used to transmit status or convey emergency situations, or to relay information;

C. security camera: used to capture and forward images when triggered by various input sources, including for example a 360 degree camera; and D. emergency backup light: used to provide minimal lighting in emergency situations.

These output sensors 50 can be activated based upon connected input sources 48, or by remote commands received from a communications circuit 632 (FIG. 34) associated with the device of the disclosure. In some cases, sensors 48/50 operate as both input and output devices. Additionally, it should be understood that other input, output, or combination devices exist, or which may be hereinafter developed, which can be incorporated into modular sensor modules 626 of the disclosure, and that the foregoing list contains only a few such examples.

A hub 700 is attached to plug 22 (visible in FIG. 21), and in the embodiment shown in FIG. 12, which exposes release push button 36, an optional diagnostic or peripheral electrical connector 702, and optional indicator lights 704, or an acoustic transducer (not shown). Hub 700 together with attached sensor modules 626 can be affixed to a surface, such as a floor, wall, or ceiling. In the embodiment shown in FIG. 34, an electrical cable emerges from a central location, as described in the incorporated references, and passes to a lighting fixture 800 suspended from hub 700. This configuration places sensors 48, 50 proximate the ceiling, which advantageously exposes all or room or a large area to sensing, facilitating the transmission of signals. This is particularly advantageous, for example, for WIFI or BLUETOOTH transmission, capturing images by camera, or motion sensing. By using assembly 600 for supporting lighting fixture 800, there is a concomitant provision of a source of power for sensors 48/50 and associated electronic components, and electronic components of hub 700, described elsewhere herein.

Assembly 600, including hub 700, can be provided with an outer housing 620 having a surface finish which is attractive for installation in homes or offices or other locations where aesthetics are important. Any known material can be used for the outer surface of assembly 600, including plastic or other synthetic material, metals, or natural materials such as leather or wood. While the embodiments shown are round, any shape can be provided, such as oval, polygonal, rectangular, or arbitrary.

FIGS. 16-18 illustrate an upper side of assembly 600, showing plug 22 connected to a central board 710 and outer housing 620. A top cover 622 encloses central board 710 and electronic sensor boards 630. In this embodiment, central board 710 is circular, and sensor boards 630 are arranged about a periphery of central board 710. Housing 620 forms a central hub housing 706 and a series of module housings 628, each of which is sized to independently contain and support an electronic sensor board. Central hub housing 706, together with central board 710 and its associated connectors, forms a central hub 700. A module housing 628, together with a sensor board 630 and its associated connectors forms a module 626. As can be seen in FIGS. 12-14, any number of sensor modules 626 can be connected to central hub 700. As depicted, 5, 8, and 12 module assemblies 600 are shown in FIGS. 12-14, respectively.

At least one of the sensor boards 630 has an electrical connector 612 for connecting to a mating connector 614 on central board 710. In the embodiment illustrated, each sensor board 630 is provided with a connector 612. Connector 612 can be a USB C connector, for example, although one or more of a wide variety of connectors could be used, in accordance with size and power requirements, number of connections needed, durability, cost, and other considerations. A notch or aperture 616 can be provided within container 626 to enable the connection to be formed, while maintaining connector 612 within housing 620. A central passage 708 enables release button 36 to be pressed while preventing contact with central board 710. A connector aperture 714 is provided to enable access to connector 702, attached to central board 710. Sensors 48/50 can be attached to sensor boards 630, or to housing 620, connected by wires as needed. Lenses or other protective covering can be positioned upon housing 620 to protect sensors 48/50.

Central board 710 can cooperate with sensor boards and thereby sensor modules 626 through the connector 702, or by wireless means, to provide functionality missing from sensor module 626, for example power or signal processing, or to relay information from a sensor module 626 to a network. In this manner, it is possible to avoid redundant capabilities among attached sensor modules 626, each relying instead on services provided by central board 710. Additionally, central board 710 can include costly components which can be shared among the sensor modules 626, thereby reducing the overall cost of assembly 600. Central board 710 can include, for example, the functions of control circuit 15 in the incorporated references. In embodiments, central board 710 is not provided, where sensor modules 626 can function independently, or in cooperation with each other.

Connectors 612 and 702 can be provided with sufficient contacts to enable the transmission of power, data, or power and data. For example, some modules 626 may only need power, being capable of independently transmitting and/or receiving data. Alternatively, some modules 626 may contain a source of power, and need only communicate data to central board 710. Finally, some modules may not use connector 612 for any purpose, or for only a mechanical connection. In an embodiment, central board 710 includes a standard networking communication circuit, such as ethernet or USB, each connector 702 forming a port for the network. In this manner, any sensor module 626 can be plugged into any connector 702. In other embodiments, certain connectors 702 can only be used for one or more designated module 626 types. Connectors 702 can accordingly be sized or shaped to only permit connection with such designated module 626 types.

In FIG. 26, it may be seen that sensor modules 626 can be connected to each other by radially disposed connectors 612A, 612B. In this manner, sensor modules 626 can mutually cooperate to augment the overall functionality of the connected sensor modules 626, or to share data or power. In this manner, the functionality of central board 710 can be provided in the form of modules, which may or may not include sensors 48/50, where functionality can be added as needed.

As additionally shown in FIG. 26, central hub housing 706 and/or module housing 628 can be configured to have an opening or removable surface 706A, 628A, respectively, whereby an interior of central hub housing 706 or module housing 628 can be accessed. This can be advantageous as it can eliminate a need to remove a sensor module 626 or to demount assembly 600, depending on how they are attached, when carrying out certain functions, including for example to replace a battery, or to configure or replace a board 710, 630.

Modules 626 can be attached to hub 700 by any known means, including for example using magnets, hook and loop fastener, sliding dovetail connection, interference fit, snap connection, one or more screws, adhesive, or the mechanical connection formed between connectors 612 and 702.

Turning now to FIGS. 20-23, a socketed or modular assembly 600A contains similar components as described with respect to assembly 600, however plug 22 is replaced with a socket 24, which is affixed to housing 620A or includes a strap for connecting to an electrical box of a building. In the latter embodiment, socket 24 can initially be connected to the electrical box as described in the incorporated references, and subsequently modular housing 620A is connected to socket 24. Alternatively, housing 620A and socket 24 are simultaneously connected to the electrical box or other mounting point, as shown in FIG. 20, for example using strap 232. For example, central board 710 can be assembled within hub 700 after a mechanical connection is made to socket 24 and hub housing 628, and after an electrical connection is made between socket 24 and conductors in the electrical box.

Once attached to or positioned upon a structure, a device including a plug 22 can be connected to socket 24 as described in the incorporated references. Other components are as described with respect to assembly 600, however in the embodiment of FIGS. 20-23, top cover 622A is positioned adjacent to an insertion end of socket 24. As such, apertures 624 are provided in top cover 622/622A as needed for sensors 48/50. Sensors 48/50 can be mounted to either top cover 622A or to sensor boards 630, as shown.

Each sensor module 626 can be dedicated to a particular task, or multiple tasks, and can contain one or more sensors 48/50. In one embodiment a sensor module is configured to support a set of functions, for example delivering media content from a particular source to one or more output devices within the area of assembly 600 (600 collectively referring to 600/600A herein), for example to an audio system or television. For example, a module 626 can function in the manner of a ROKU or CHROMECAST device, for example if a TV is suspended from and connected to assembly 600. Sensor module 626 can likewise emulate or provide services such as ALEXA or an "OK Google" voice search.

A sensor module can be configured to cooperate with a popular computer operating system, such as MICROSOFT WINDOWS, APPLE iOS or OS X, or LINUX. In another embodiment, sensor module 626 cooperates with a particular shopping service, such as AMAZON, for example relaying requests for particular products from another device, or by spoken words. A software development kit (SDK) can be provided for central board 710 or any of sensor boards 630, so that developers can create applications which exploit features of either board.

Figure 29:
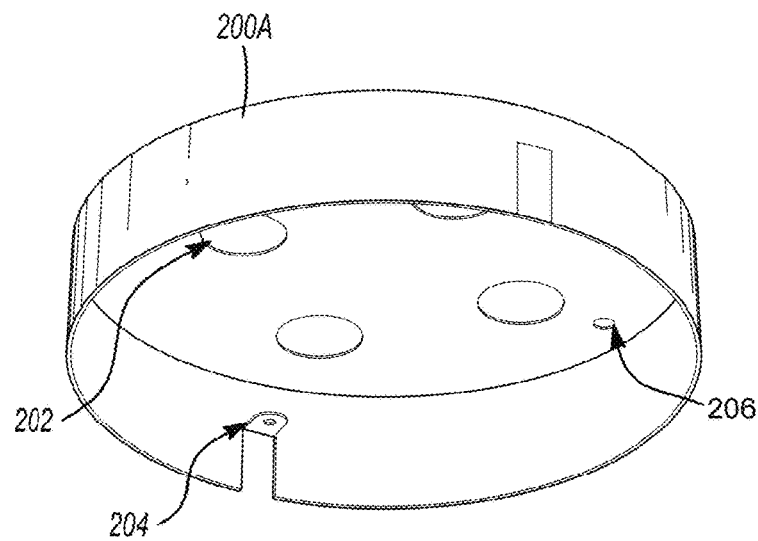
FIG. 29 depicts an electrical junction box sized and dimensioned to contain all or a portion of an attachable electrical device of the disclosure.
Figure 30:
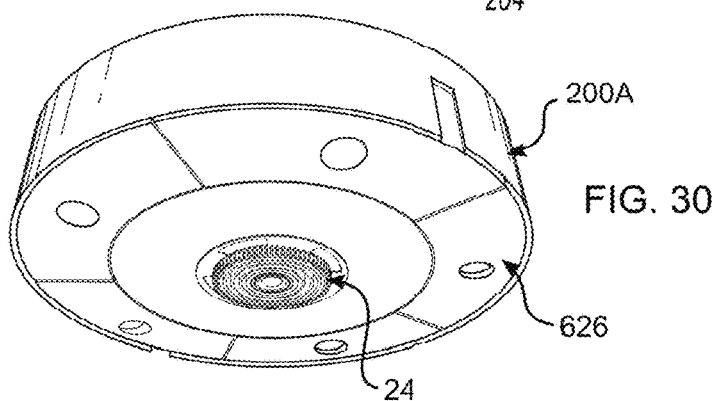
FIG. 30 depicts an attachable electrical device of the disclosure mounted within the electrical box of FIG. 20.
Figure 31:
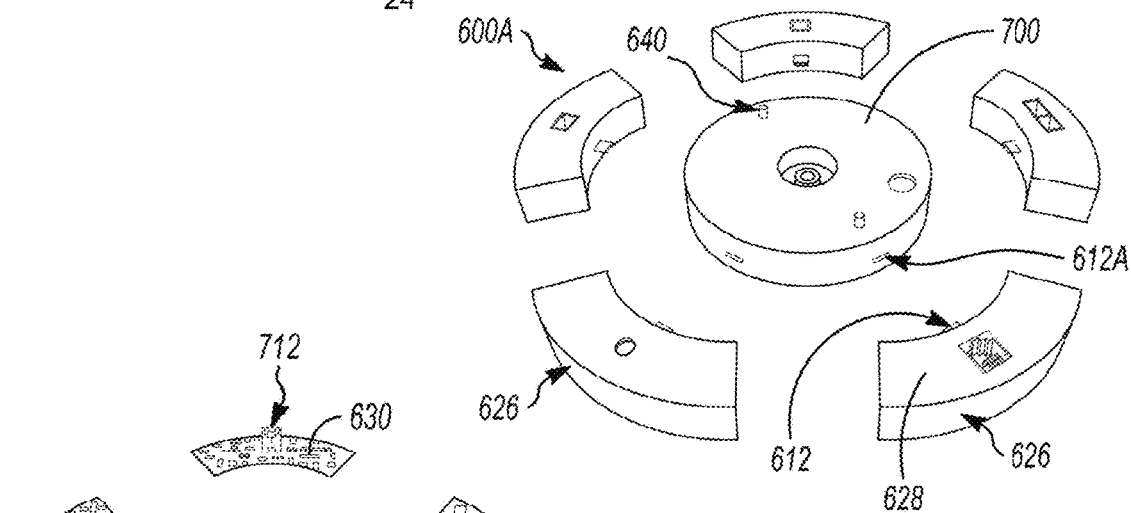
FIG. 31 is an exploded view of the device of FIG. 30.

FIGS. 27-29 depict one embodiment of a reverse side/plug side of module 600 (or 600A, collectively 600 herein), in which one or more supply connectors 712A-E are provided for making various wired connections with circuits which have plugged extensions provided within an electrical junction box 200/200A, for example as shown in FIGS. 24-25, 31, or other junction box type. In FIG. 29, supply connectors 712 are positioned within module 626, and in FIG. 30 supply connectors 712 are positioned within central hub 700. As such, in the embodiment of FIG. 29, modules can be replaced to create a desired configuration having predetermined connectors 712. Alternatively, in the embodiment of FIG. 30, central hub can be configured for all supported types of connections, and modules 626 can be provided as needed to provide a desired functionality.

It should be understood that in either the embodiment of FIG. 27 or 28, the number of different connector 712 types provided correspond to the capabilities provided by modules 626 or hub 700, or the types of connections available within the edifice at junction box 200. Connectors 712A-E depict popular push in/screw on type standardized connectors. Specifically, in FIGS. 27-28, connectors 712A-E correspond to the following connection types, respectively: LC fiber optic, RJ11, SC fiber optic, RJ-45, and Coax. These connection types may not all be present, or other connection types can be provided. Where such standardized connectors are not included, screw or push terminals, wire leads, or any other type of connector can be provided for connecting assembly 600 to one or more wiring circuits of the edifice.

Mounting screws are provided for connecting assembly 600 to mating threaded apertures within junction box 200, such as mounting brackets 204 of junction box 200A of FIG. 29. Screws are not depicted in FIG. 28, but can be similarly provided, or other mounting hardware can be provided, for example outer housing 620 can threadably engage junction box 200, or separate straps or mounting brackets can be provided. A cable aperture 642 can be provided to pass a power cable or other cable through assembly 600, to a suspended or other external device connected to assembly 600.

With reference to FIGS. 29-30, an electrical junction box 200 can be mounted within a wall, ceiling, table, or other surface. An assembly 600 can be mounted above, partially within, or wholly within box 200, in the latter case to form a flush or nearly flush surface with respect to the plane of the mounting surface. Box 200 is provided with a plurality of box connector apertures 202, whereby the various signal and power cables can be brought into box 200 and secured in mechanical connection therewith. One or more mounting brackets 204 can be provided to secure assembly 600 to box 200, positioned at the correct height, leaving space for wires and connections. In an embodiment, box 200 can be divided to separate higher power connections from relatively lower power connections. One or more mounting apertures 206 can be provided to attach box 200 to a wall, floor, or ceiling of an edifice, or to a furniture object, or other structure.

Figure 32:
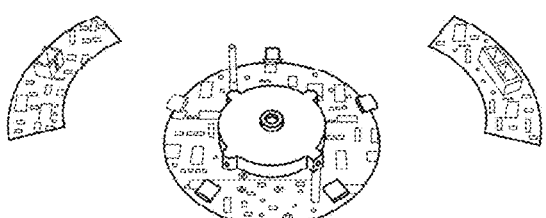
FIG. 32 is an exploded view of circuit boards disposed within the device of FIG. 31.

In FIGS. 31-32, it may be seen that modules 426 can be separated from hub 700, and replaced as needed, or moved to an alternate location upon hub 700, connected in this illustration through connector 612 and radial connector 612A. In FIG. 32, in which housings 628/706 are removed, it may be seen that connectors 712 can be affixed in electrical connection to sensor/active board 630, and may pass through openings in housing 628/706.

As noted elsewhere herein, assembly 600 can be used to relay information, including transmitting signals by WiFi, Bluetooth, or other wireless protocol, or by a wired protocol. As discussed, sensor signals can be routed in this manner, as well as media signals, such as media content, including shopping content. FIGS. 34-36 depict various ways in which routing of information, in particular, can be conveniently carried out using assembly 600 of the disclosure, with or without the transmission of sensor data. As shown in FIG. 34, an assembly 600B includes a central board 710 which includes connectors 712, and optionally power supply cabling for lighting or other purpose, and for powering board 710, although in this embodiment, for example, power over ethernet could be used, particularly if the only consumer of electrical power will be central board 710, or if otherwise the total power requirements are within suitable parameters.

Assembly 600B can include sensing modules 626 and sensors 26, generally, or may only serve to route network traffic using receivers 48 and transmitters 50, as shown in FIGS. 34-36. Whether or not other functionality as described herein is provided, it should be understood that assembly 600B can provide any type of data transmission functionality using receivers 48 and transmitters 50, including functioning as a WiFi router or extender, or other router or modem, hub, smart switch, or any other electronic information relay or router.

A front face of assembly 600 of FIGS. 27-28 can be provided with a socket 24, and optionally sensor apertures 624, in the manner of the embodiments of FIGS. 18-22 and 24, and is connected to an additional fixture or device as described elsewhere herein.

As opposed to connecting assembly 600 to junction box 200 with screws, as described elsewhere herein, assembly 600 can be provided with a plug 22, and can be assembled onto an edifice which is provided with a socket 24. For example socket/plug 24/22 can be used to form high power connections, and connectors 712 can be used to form signal or relatively lower power connections.

In FIG. 35, a hanging lamp 646A includes a canopy which covers assembly 600B, but is fabricated with materials and in a manner which does not significantly block the transmission of desired wireless signals. The lamp portion 650 may or may not include anything other than conventional lamp components, without sensors. In FIG. 36, lamp portion 650A is mounted directly to central housing 706. A release button 36A includes a rod, which can further serve as a wireless antenna. Similarly, cable 644 in FIG. 35 can function as an antenna, or an antenna lead can be embedded within cable 644. Additionally, an antenna can be positioned within lamp portion 650. It can be advantageous to provide router/extender/modem functionality within a lamp, as lamps are frequently either centrally disposed within a room, or are distributed evenly about a room, and are often placed on the ceiling, all of which lead to maximum coverage and minimum interference.

Figure 38:
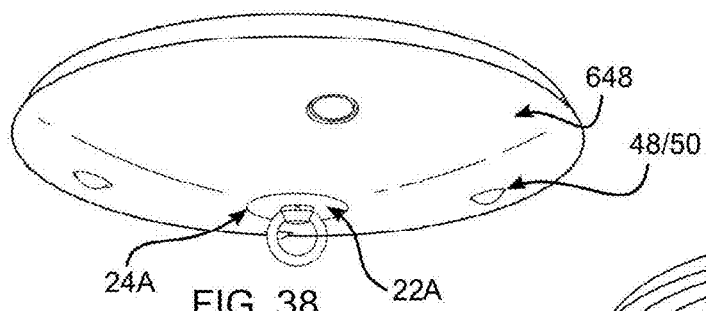
FIG. 38 depicts the device of FIG. 37, including a socket having a swage style fitting extending from the socket.

With reference to FIG. 37, a socket 24A is recessed within a dome shaped canopy 648A. Various plugs 22 as described herein can be inserted into socket 24, including a plug 22A which has a swage fitting 652, as shown in FIG. 38. Alternatively, a separate plug 22 is provided, and swage fitting 652 is connected to canopy 648A and electrically connected to the plug 22.

Figure 39:
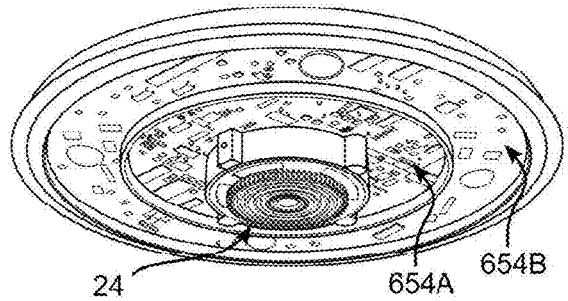
FIG. 39 depicts an electronics assembly of the disclosure including a socket, and including two concentric circuit boards associated with a socket of the disclosure.

FIG. 39, depicts a device of the disclosure which includes any of a socket 24, plug 22, or combination 23, a socket being depicted, and two concentric ring shaped circuit boards 654A, 654B which can be interconnected or can otherwise be placed in interoperable communication with each other. Either or both of the boards 654A, 654B can be replaced with other, similarly shaped boards, which provide different functionality, all as described herein for various circuit boards, including for example sensing modules 626, communications circuit 632, a power supply circuit, or any other circuit which provides functionality as described herein. While two concentric boards are shown, it should be understood that a greater or lesser number of concentric boards can be provided.

Figure 40:
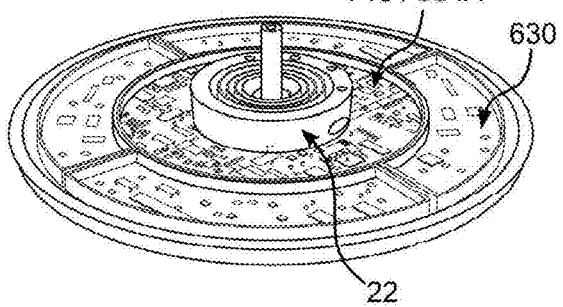
FIG. 40 depicts an electronics assembly of the disclosure including a plug, and including two concentric circuit boards associated with a socket of the disclosure.

FIG. 40 is a device as described with respect to FIG. 39, but further includes modular boards 630. While only one concentric ring shaped board 654A, 654B is shown, it should be understood that two or more such boards can be provided. Further, in addition to carrying various sensors 630 (as defined herein), boards 630 can include any electronic device which supports the various electronic functions described herein.

Figure 41:
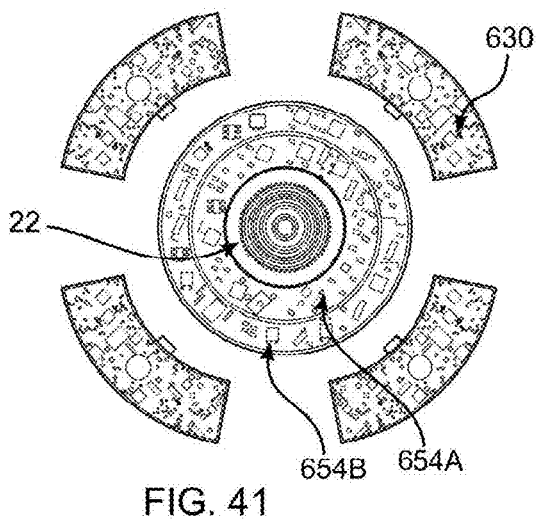
FIG. 41 depicts an electronics assembly of the disclosure, including two concentric circuit boards associated with a plug of the disclosure, and further including concentric replaceable plug-in circuit units.
Figure 42:
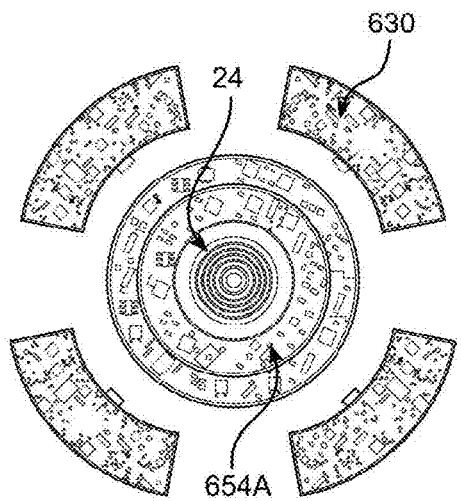
FIG. 42 depicts an electronics assembly of the disclosure, including two concentric circuit boards associated with a socket of the disclosure, and further including concentric replaceable plug-in circuit units.

FIGS. 41-42 depict socket 24 and plug 22 containing boards 654A, 654B, 630, respectively, as described with respect to FIGS. 39-40. However, the embodiment of FIGS. 41-42 include both multiple replaceable concentric rings 654A, 654B, as well as replaceable modules 630.

Figure 43:
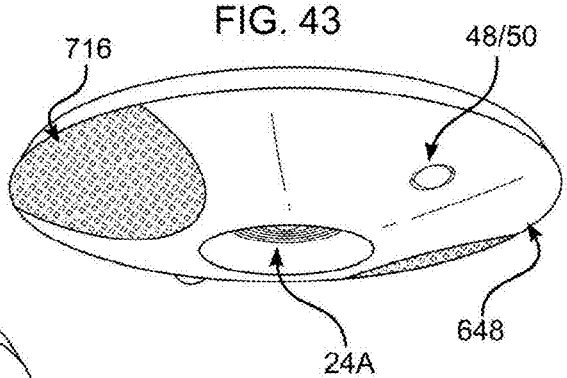
FIG. 43 depicts a device of the disclosure, including a dome shaped canopy housing a recessed socket of the disclosure, the canopy further housing speakers.

In FIG. 43, a dome shaped canopy 648B includes speakers, as well as other sensors 630.

Figure 44:
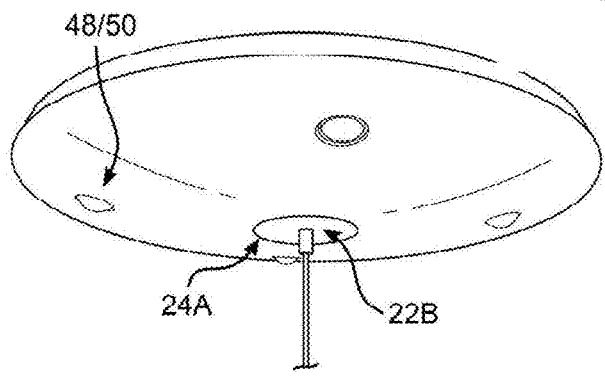
FIG. 44 depicts a device of the disclosure, including a dome shaped canopy housing a recessed socket of the disclosure, a module inserted into the socket including a pendant electrical wire, or alternatively housing an antenna.

FIG. 44 depicts a dome shaped canopy 648C which houses a recessed socket 20 provided with a plug 22 including a pendent type device, such as a lamp cord or an antenna 656.

FIG. 45 depicts a canopy housing sensors, and a socket that is disposed flush with a surface of the canopy. In FIG. 46, a device of the disclosure includes replaceable modules with sensors, and other modules with replaceable speakers.

Figure 50:
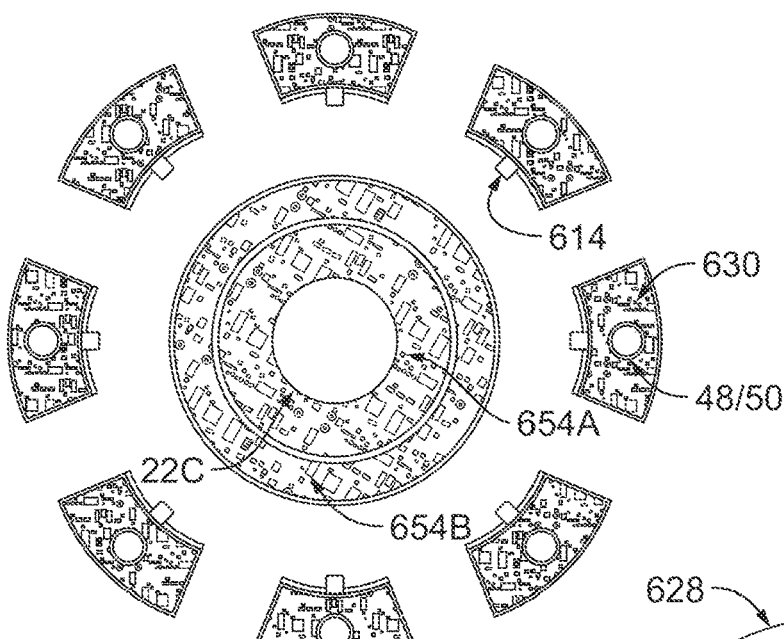
FIG. 50 is an exploded view of a device similar to FIG. 47, but with additional replaceable modules.

In FIG. 47 a recessed socket has received a plug which includes an associated light. The device further includes sensors associated with removable modules. A front view of the device is shown in FIG. 48, with the canopy removed, and in an exploded view in FIG. 49. FIG. 50 shows an exploded view of a device similar to FIG. 47, but with additional replaceable modules.

Figure 51:
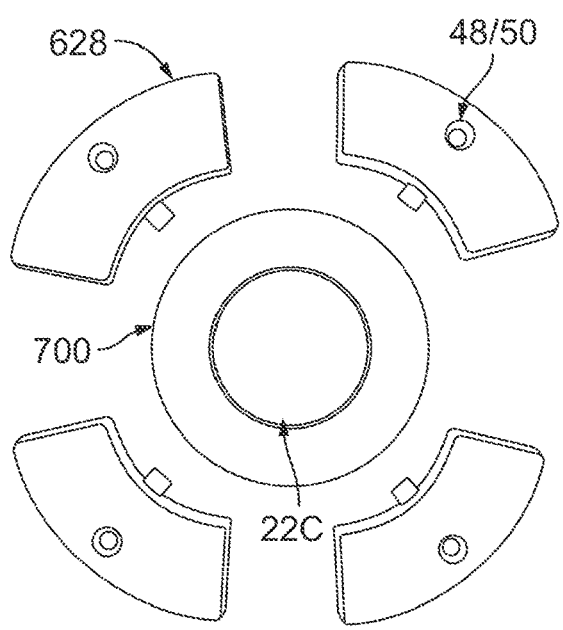
FIG. 51 is an exploded view of a device similar to FIG. 31, including replaceable sensor modules, and further including a plug having a light inserted into a recessed socket.

FIG. 51 shown an exploded view of a device similar to FIG. 31, including replaceable sensor modules, and further includes a plug having a light inserted into a recessed socket.

Figure 52:
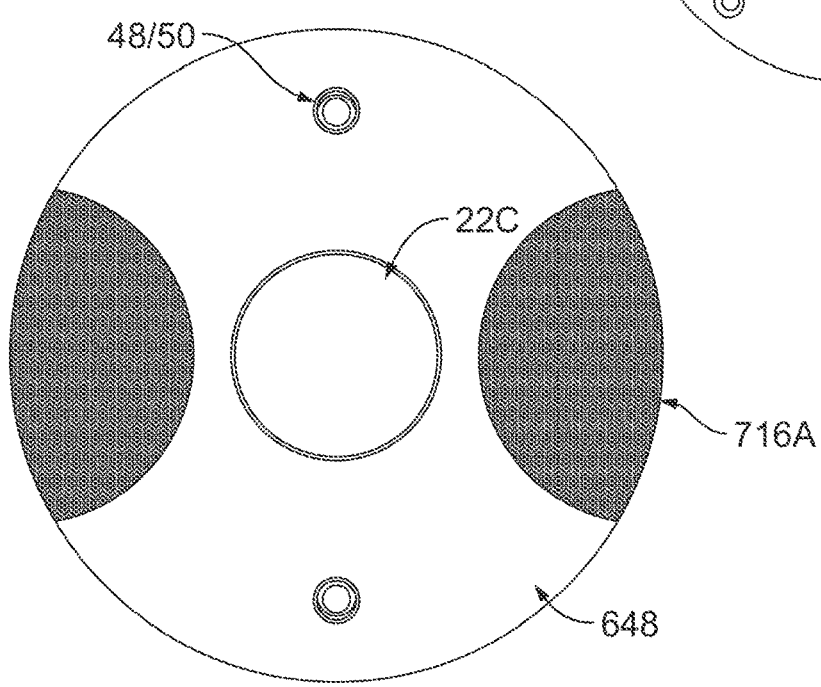
FIG. 52 is a front view of a device including speakers and sensors, and further including a plug with a light inserted into a recessed socket.

In FIG. 52 a device of the disclosure includes speakers and sensors, and further includes a plug with a light inserted into a recessed socket.

All references cited herein are expressly incorporated by reference in their entirety. It will be appreciated by persons skilled in the art that the present disclosure is not limited to what has been particularly shown and described herein above. In addition, unless mention was made above to the contrary, it should be noted that all of the accompanying drawings are not to scale. There are many different features to the present disclosure and it is contemplated that these features may be used together or separately. Thus, the disclosure should not be limited to any particular combination of features or to a particular application of the disclosure. Further, it should be understood that variations and modifications within the spirit and scope of the disclosure might occur to those skilled in the art to which the disclosure pertains. Accordingly, all expedient modifications readily attainable by one versed in the art from the disclosure set forth herein that are within the scope and spirit of the present disclosure are to be included as further embodiments of the present disclosure.

| REFERENCE NUMBERS: | |
|---|---|
| 15 | control circuit |
| 20 | quick connect device |
| 22 | plug |
| 22A | plug including swage |
| 22B | plug including pendant cable |
| 22C | plug including light |
| 23 | combined plug and socket |
| 24 | socket |
| 24A | recessed socket |
| 25 | non-conductive body |
| 26 | sensing unit |
| 27 | first side of body 25 |
| 35 | second side of body 25 |
| 36 | release push button |
| 42 | combination device |
| 44 | switch |
| 48 | recv/input device (sensor) |
| 50 | xmit/output device (sensor) |
| 52 | combination device |
| 54 | LED fixture |
| 62 | device plug |
| 64 | threaded bore |
| 72 | socket |
| 74 | junction box |
| 200/200A | electrical junction box |
| 202 | connector apertures |
| 204 | mounting brackets |
| 206 | mounting apertures |
| 600 | assembly |
| 600A | modular assembly |
| 612 | elec. connector |
| 612A/612B | radial elec. connector |
| 614 | mating elec. connector |
| 616 | notch/aperture |
| 620 | outer housing |
| 620A | modular housing |
| 622 | top cover |
| 622A | socketed top cover |
| 624 | sensor apertures |
| 626 | sensing/active module |
| 628 | module housing |
| 628A | removable module surface |
| 630 | sensor board |
| 632 | comm circuit |

| REFERENCE NUMBERS: | |
|---|---|
| 640 | mounting screws |
| 642 | cable aperture |
| 644 | power cable |
| 646A/B | lamp |
| 648, 648A-C | canopy |
| 650/650A | lamp portion |
| 652 | swage fitting |
| 654A-B | concentric boards |
| 656 | antenna |
| 700 | hub |
| 702 | peripheral elect conn. |
| 704 | indicator light |
| 706 | central hub housing |
| 706A | removable central surface |
| 708 | central passage |
| 710 | central board |
| 712 | supply connector |
| 714 | connector aperture |
| 716 | speaker module |
| 716A | speaker |
| 800 | lighting fixture |

What is claimed is:

1. A device for connecting an electrical fixture to an electrical socket of the type including a socket body having an internal cavity which contains one or more electrically conductive and concentric ring-shaped contact terminals which are electrically connected to an electrical power supply wiring, the device including
a plug rigidly fixed to the fixture and insertable into the socket, the plug having one or more male connectors electrically connected to the fixture and mateable with the one or more contact terminals within the socket to establish a circuit between the electrical fixture and the electrical power wiring; and
a spindle assembly carried on the combination of the plug and the socket for releasably coupling the plug and socket, the device comprising:
a hub surrounding the plug; and
a plurality of sensor modules releasably connectable to a periphery of the hub, the sensor modules each including an electronic device operative to receive or transmit electronic data;
wherein the hub includes a central electronics board positioned within the hub, each of a plurality of the sensor modules electrically connectable to the central electronics board when the respective sensor module is connected to the periphery of the hub;
wherein the hub is circular, and each of the plurality of sensor modules includes a circuit board having an arcuate shape corresponding to a radius of the hub; and
wherein each of the plurality of sensor modules is releasably connectable to the hub using at least one of magnet, hook and loop fastener, sliding dovetail connection, interference fit, snap connection, one or more screws, adhesive, or a mechanical connection formed by an electrical connector.

2. The device of claim 1, wherein at least two of the plurality of sensor modules are mutually electrically connectable using a wired connector, when the at least two of the sensor modules are connected to the periphery of the hub.

3. The device of claim 1, wherein at least one sensor module wirelessly communicates a sensed condition.

4. The device of claim 3, wherein at least one of the plurality of sensor modules wirelessly receives a signal.

5. The device of claim 4, wherein the signal is a command signal to control the device and/or an associated electrical fixture.

6. The device of claim 5, wherein the command signal results from the sensed condition.

7. The device of claim 1, wherein at least one of the plurality of sensing modules includes a transmitting sensor for receiving at least one of an RF, Wi-Fi, and Bluetooth sensor.

8. The device of claim 1, wherein at least one of the plurality of sensing modules detects an environmental condition including at least one of temperature, humidity, smoke, carbon monoxide, motion, and presence.

9. The device of claim 1, wherein at least one of the plurality of sensing modules includes at least one of a security camera, glass breakage detector, motion/presence detector, and emergency lighting.

10. The device of claim 1, wherein each of the plurality of sensor modules include a housing.

11. The device of claim 10, wherein the housing includes an access opening.

* * * * *